US012643693B2

(12) United States Patent
Ol et al.

(10) Patent No.: US 12,643,693 B2
(45) Date of Patent: Jun. 2, 2026

(54) COAXIAL ROTOR PAIR ASSEMBLY WITH VARIABLE COLLECTIVE PITCH ROTOR / PROPELLER FOR FLIGHT VEHICLE OR DRONE

(71) Applicant: Toofon, Inc., El Segundo, CA (US)

(72) Inventors: Michael V. Ol, El Segundo, CA (US); Morteza Gharib, El Segundo, CA (US); Amir Emadi, El Segundo, CA (US)

(73) Assignee: TOOFON, INC., El Segundo, CA (US)

( * ) Notice: Subject to any disclaimer, the term of this patent is extended or adjusted under 35 U.S.C. 154(b) by 176 days.

(21) Appl. No.: 18/508,395

(22) Filed: Nov. 14, 2023

(65) Prior Publication Data

US 2024/0158111 A1     May 16, 2024

Related U.S. Application Data

(60) Provisional application No. 63/425,133, filed on Nov. 14, 2022.

(51) Int. Cl.
| | |
|---|---|
| B64U 30/297 | (2023.01) |
| B64U 10/16 | (2023.01) |
| B64U 30/24 | (2023.01) |

(52) U.S. Cl.
CPC ........... B64U 30/297 (2023.01); B64U 10/16 (2023.01); B64U 30/24 (2023.01); B64U 2201/10 (2023.01)

(58) Field of Classification Search
CPC .................................................. B64U 30/257
See application file for complete search history.

(56) References Cited

U.S. PATENT DOCUMENTS

| | | | |
|---|---|---|---|
| 3,179,353 | A | 4/1965 | Peterson |
| 4,601,444 | A | 7/1986 | Lindenbaum |
| 4,880,071 | A | 11/1989 | Tracy |

(Continued)

FOREIGN PATENT DOCUMENTS

| | | | |
|---|---|---|---|
| CN | 107140198 | * | 9/2017 |
| CN | 109533306 A | | 3/2019 |

(Continued)

OTHER PUBLICATIONS

Machine translation of CN107140198.*

(Continued)

*Primary Examiner* — Jean Paul Cass
(74) *Attorney, Agent, or Firm* — Pillsbury Winthrop Shaw Pittman LLP

(57)     ABSTRACT

A coaxial rotor pair assembly, e.g., for a flight vehicle or drone, with a fixed-pitch rotor and a variable-pitch rotor that are axially spaced relative to one another on a rotor axis for rotation via rotor shafts. A first motor and a second motor are provided for the rotors to drive the respective rotor about the rotor axis. The first and second motors are each controlled by a speed controller, and speed controllers are controlled by a vehicle flight controller. A collective pitch of the plurality of blades of the variable-pitch rotor is configured to be selectively varied by the vehicle flight controller during rotation of both the fixed-pitch rotor and the variable-pitch rotor about the rotor axis. The plurality of blades of the fixed-pitch rotor are maintained a constant, fixed pitch, e.g., during operation of the flight vehicle.

19 Claims, 12 Drawing Sheets

(56) References Cited

U.S. PATENT DOCUMENTS

| | | | |
|---|---|---|---|
| 5,505,407 A | 4/1996 | Chiappetta | |
| 5,971,320 A | 10/1999 | Jermyn | |
| 6,375,120 B1 | 4/2002 | Wolnek | |
| 6,467,726 B1 | 10/2002 | Hosoda | |
| 7,267,300 B2 | 9/2007 | Heath | |
| 7,364,114 B2 | 4/2008 | Wobben | |
| 7,857,254 B2 | 12/2010 | Parks | |
| 7,946,526 B2 | 5/2011 | Zimet | |
| 8,052,081 B2 | 11/2011 | Olm | |
| 8,376,266 B2 | 2/2013 | Gemmati | |
| 8,540,184 B2 | 9/2013 | Gemmati | |
| 9,051,050 B2 | 6/2015 | Achtelik | |
| 9,623,969 B2 | 4/2017 | Nelson | |
| 9,823,664 B2 | 11/2017 | Krogh | |
| 9,975,624 B1 | 5/2018 | Harvey | |
| 10,124,888 B2 | 11/2018 | Pounds | |
| 10,136,234 B2 | 11/2018 | Di Censo | |
| 10,315,759 B2 | 6/2019 | Nemovi | |
| D870,638 S | 12/2019 | Kuanliang | |
| 10,518,873 B2 | 12/2019 | Netzer | |
| 10,526,082 B2 | 1/2020 | Su | |
| 10,714,019 B2 * | 7/2020 | Yuan | G09G 3/3275 |
| 10,836,467 B2 | 11/2020 | Klein | |
| 11,021,844 B2 | 6/2021 | Kim | |
| 11,072,423 B1 | 7/2021 | Robertson | |
| 11,305,873 B2 | 4/2022 | Zhang | |
| 2004/0118970 A1 | 6/2004 | Muylaert | |
| 2006/0192046 A1 | 8/2006 | Heath | |
| 2006/0226281 A1 | 10/2006 | Walton | |
| 2007/0164148 A1 | 7/2007 | Van De Rostyne | |
| 2010/0022157 A1 | 1/2010 | Van De Rostyne | |
| 2010/0108801 A1 * | 5/2010 | Olm | B64U 50/19 |
| | | | 244/17.23 |
| 2013/0020432 A1 | 1/2013 | Yogev | |
| 2013/0092799 A1 | 4/2013 | Tian | |
| 2014/0061367 A1 | 3/2014 | Fink | |
| 2014/0091172 A1 * | 4/2014 | Arlton | B64U 50/19 |
| | | | 244/17.23 |
| 2014/0169980 A1 | 6/2014 | Kyriakides | |
| 2014/0263822 A1 | 9/2014 | Malveaux | |
| 2014/0312177 A1 | 10/2014 | Gaonjur | |
| 2015/0160255 A1 | 6/2015 | Fujihara | |
| 2015/0329204 A1 | 11/2015 | Nelson | |
| 2016/0009387 A1 | 1/2016 | Kummer | |
| 2016/0101850 A1 | 4/2016 | Lin | |
| 2016/0207368 A1 | 7/2016 | Gaonjur | |
| 2016/0207625 A1 | 7/2016 | Judas | |
| 2016/0311526 A1 | 10/2016 | Geise | |
| 2016/0347446 A1 | 12/2016 | Vetter | |
| 2017/0158306 A1 | 6/2017 | Kooiman | |
| 2017/0158342 A1 | 6/2017 | Ishii | |
| 2017/0197709 A1 | 7/2017 | Fink | |
| 2017/0320564 A1 * | 11/2017 | Kuzikov | F03D 3/061 |
| 2017/0349272 A1 | 12/2017 | Laurent | |
| 2018/0057163 A1 | 3/2018 | Sababha | |
| 2018/0141652 A1 | 5/2018 | Deslypper | |
| 2018/0244377 A1 | 8/2018 | Chan | |
| 2018/0305008 A1 | 10/2018 | Apkarian | |
| 2018/0362146 A1 * | 12/2018 | Klein | B64U 10/13 |
| 2019/0061933 A1 | 2/2019 | Cappelleri | |
| 2019/0101934 A1 | 4/2019 | Tuukkanen | |
| 2019/0106206 A1 | 4/2019 | Shi | |
| 2019/0135411 A1 | 5/2019 | Gonzalez | |
| 2019/0337607 A1 | 11/2019 | Lee | |
| 2019/0369057 A1 | 12/2019 | Mattar | |
| 2020/0017204 A1 | 1/2020 | Lacy | |
| 2020/0269980 A1 | 8/2020 | Fink | |
| 2021/0070431 A1 | 3/2021 | Nakamats | |
| 2021/0284333 A1 | 9/2021 | Windisch | |
| 2021/0371093 A1 | 12/2021 | Nakamats | |
| 2022/0089279 A1 | 3/2022 | Rosen | |
| 2022/0169376 A1 | 6/2022 | Dugré | |
| 2022/0169398 A1 | 6/2022 | Ouellet | |
| 2022/0185464 A1 | 6/2022 | Gharib | |

| | | | |
|---|---|---|---|
| 2022/0194573 A1 | 6/2022 | Nemovi | |
| 2022/0227489 A1 | 7/2022 | Ol | |
| 2022/0297822 A1 | 9/2022 | Ol | |

FOREIGN PATENT DOCUMENTS

| | | | | | |
|---|---|---|---|---|---|
| CN | 112078784 A | | 12/2020 | | |
| CN | 112219036 A | * | 1/2021 | | B64D 31/06 |
| CN | 112357070 A | | 2/2021 | | |
| DE | 102005003028 A1 | | 7/2006 | | |
| EP | 3683141 | | 7/2020 | | |
| GB | 281721 A | | 8/1928 | | |
| GB | 2418405 A | | 3/2006 | | |
| GB | 2455374 A | | 6/2009 | | |
| GB | 2483881 A | | 3/2012 | | |
| JP | 2002347698 A | | 12/2002 | | |
| JP | 2014119828 A | | 6/2014 | | |
| JP | 2018095236 A | * | 6/2018 | | B64C 27/52 |
| JP | 2019181965 A | | 10/2019 | | |
| JP | 2020033000 A | | 3/2020 | | |
| JP | 2020131779 A | | 8/2020 | | |
| KR | 20120060590 A | | 6/2012 | | |
| KR | 101784372 B1 | | 10/2017 | | |
| KR | 20170111921 A | | 10/2017 | | |
| KR | 20180069594 A | | 6/2018 | | |
| KR | 101884902 | | 8/2018 | | |
| KR | 101894409 B1 | | 9/2018 | | |
| KR | 102025687 B1 | | 9/2019 | | |
| KR | 102740958 B1 | * | 12/2024 | | B64U 10/16 |
| WO | WO-2016032356 A1 | * | 3/2016 | | B64C 39/06 |
| WO | 2016089882 A1 | | 6/2016 | | |
| WO | 2016164280 A1 | | 10/2016 | | |
| WO | 2017035593 A1 | | 3/2017 | | |
| WO | 2017081668 A1 | | 5/2017 | | |
| WO | 2020191489 A1 | | 10/2020 | | |
| WO | 2022125132 A1 | | 6/2022 | | |
| WO | 2022139864 A1 | | 6/2022 | | |
| WO | 2022150833 A1 | | 7/2022 | | |
| WO | 2022159951 A1 | | 7/2022 | | |
| WO | 2022198225 | | 9/2022 | | |

OTHER PUBLICATIONS

Machine Translation of JP2018095236A.*

Machine translation of CN12219038B.*

International Search Report and Written Opinion for International Application No. PCT/IB2023/061504, dated Feb. 14, 2024, 10Pgs.

Murray et al., The flying sidekick traveling salesman problem: Optimization of drone-assisted parcel delivery; Transportation Research Part C: Emerging Technologies, Mar. 2015, vol. 54, pp. 86-109, doi: 10.1016/j.trc.2015.03.005.

Oosedo et al., Optimal transition from hovering to level-flight of a quadrotor tail-sitter uav; Autonomous Robots, 2017, First Published Jul. 25, 2016, vol. 41, No. 5, pp. 1143-1159, doi: 10.1007/s10514-016-9599-4.

Papachristos et al., Model predictive attitude control of an unmanned tilt-rotor aircraft; Industrial Electronics, IEEE International Symposium on Jun. 27-30, 2011, pp. 922-927, doi: 10.1109/ISIE.2011.5984282.

Park et al., Fault tolerant flight control system for the tilt-rotor uav; Journal of the Franklin Institute, Nov. 2013, vol. 350, No. 9, pp. 2535-2559, doi: 10.1016/j.jfranklin.2013.01.014.

Perez et al., A ground control station for a multi-uav surveillance system; Journal of Intelligent & Robotic Systems, vol. 69, No. 1, Jan. 2013, pp. 119-130, doi: 10.1007/s10846-012-9759-5.

Renuke, Dynamic Analysis of a Car Chassis; International Journal of Engineering Research and Applications, vol. 2, No. 6, Nov.-Dec. 2012, pp. 955-959.

Ritz et al., A global controller for flying wing tailsitter vehicles; IEEE International Conference on Robotics and Automation, May 29-Jun. 3, 2017, pp. 2731-2738, doi: 10.1109/ICRA.2017.7989318.

Rogers, Propeller Efficiency Rule of Thumb; NAR Associates, 2010, 5 pgs.

Ryll et al., A novel overactuated quadrotor unmanned aerial vehicle: Modeling, control, and experimental validation; IEEE Transactions

(56) References Cited

OTHER PUBLICATIONS on Control Systems Technology, Nov.-Dec. 2012, Jul. 30, 2014, vol. 23, No. 2, pp. 540-556, doi: 10.1109/TCST.2014.2330999.

Ryll et al., Modeling and control of fast-hex: A fully-actuated by synchronizedtilting hexarotor; IEEE/RSJ International Conference on Intelligent Robots and Systems, Oct. 9-14, 2016, pp. 1689-1694, doi: 10.1109/IROS.2016.7759271.

Rysdyk et al., Adaptive model inversion flight control for tilt-rotor aircraft; Journal of guidance, control, and dynamics, May-Jun. 1999, vol. 22, No. 3, pp. 402-407, doi: 10.2514/2.4411.

Saied et al., Fault diagnosis and fault-tolerant control strategy for rotor failure in an octorotor; IEEE International Conference on Robotics and Automation, May 26-30, 2015, pp. 5266-5271, doi: 10.1109/ICRA.2015.7139933.

Sheldahl et al., Aerodynamic characteristics of seven symmetrical airfoil sections through 180-degree angle of attack for use in aerodynamic analysis of vertical axis wind turbines; Sandia National Labs., Albuquerque, NM (USA), Technical Report, 1981, doi: 10.2172/6548367.

Shepperd, Quaternion from rotation matrix.[four-parameter representation of coordinate transformation matrix],; Journal of Guidance and Control, Jun. 1, 1978, vol. 1, pp. 223-224.

Stone et al., Flight testing of the t-wing tail-sitter unmanned air vehicle; Journal of Aircraft, Mar.-Apr. 2008, vol. 45, No. 2, pp. 673-685, doi: 10.2514/1.32750.

Tayebi et al., Attitude stabilization of a vtol quadrotor aircraft; IEEE Transactions on control systems technology, Apr. 24, 2016, vol. 14, No. 3, pp. 562-571, doi: 10.1109/TCST.2006.872519.

Tomic et al., Toward a fully autonomous uav: Research platform for indoor and outdoor urban search and rescue; IEEE Robotics Automation Magazine, Sep. 4, 2012, vol. 19, No. 3, No. 46-56, doi: 10.1109/MRA.2012.2206473.

Veismann et al., Autonomous Flying Ambulance Aerodynamic Characterization; Analysis Report, California Institute of Technology, Aug. 9, 2018, 20 pgs.

Wick, Study of the subsonic forces and moments on an inclined plate of infinite span; National Advisory Committee for Aeronautics, Technical Note 3221, Jun. 1954, 26 pgs.

Zhang et al., A controllable flying vehicle with a single moving part; IEEE International Conference on Robotics and Automation, May 16-21, 2016, pp. 3275-3281, doi: 10.1109/ICRA.2016.7487499.

International Preliminary Report on Patentability for International Application No. PCT/US2022/07055, dated Aug. 3, 2023, 6 pages.

International Search Report and Written Opinion for International Application No. PCT/US2022/071201, Search completed Jun. 27, 2022, Mailed Jun. 30, 2022, 12 Pgs.

International Search Report and Written Opinion for International Application No. PCT/US2021/028467, Search completed Sep. 9, 2021, Mailed Sep. 10, 2021, 8 Pgs.

International Search Report and Written Opinion for International Application No. PCT/US2021/028483, Search completed Sep. 17, 2021, Mailed Sep. 17, 2021, 8 Pgs.

International Search Report and Written Opinion for International Application No. PCT/US2022/070255, Search completed May 10, 2022, dated May 10, 2022, 8 Pgs.

"EVTOLS transportation of the future?", Xplane.org, General Discussion, Jul. 28, 2017, Retrieved from the Internet https://forums.x-plane.org/index.php?/forums/topic/126735-evtols-transportation-of-the-future/&page=6.

"Must quadcopters have the same propeller sizes?", Aviation, Oct. 21, 2018, Retrieved from the Internet https://aviation.stackexchange.com/questions/56237/must-quadcopters-have-the-same-propeller-sizes.

"Why aren't there more manned quadcopter designs?", Mavic Pilots, Mar. 10, 2017, Retrieved from the Internet https://mavicpilots.com/threads/why-arent-there-more-manned-quad-copter-designs. 10077/ p. 2.

Du, "Pentacopter build log", DYI Drones, Jul. 20, 2018, Retrieved from the Internet https://diydrones.com/profiles/blogs/pentacopter-build-log.

Lenski, "Design, Construction and Operation of a Pentacopter", Thesis, Lulea University of Technology, Department of Computer Science, Electrical and Space Engineering, Mar. 2017, 84 pgs.

Lillian, "A Bunnycopter and Pentacopter? MIT Lets You Create Whatever Drone You Want", Unmanned Aerial, Dec. 5, 2016, Retrieved from the Internet https://unmanned-aerial.com/a-bunnycopter-and-pentacopter-mit-lets-you-create-whatever-drone-you-want.

Mohamed et al, "Design and Control of Novel Tri-rotor UAV", IEE Proceedings of 2012 UKACC International Conference on Control, Sep. 3-5, 2012, DOI: 10.1109/CONTROL.2012.6334647.

Yumurtaci, "Help with Differential Thrust for a VTOL", ArduPilot, May 2020, Retrieved from the Internet https://discuss.ardupilot.org/t7help-with-differential-thrust-for-a-vtol/56029.

International Search Report and Written Opinion for International Application No. PCT/US2022/070079, Search completed May 3, 2022, Mailed May 3, 2022, 7 Pgs.

"Fully Mobile, Always Adaptable: Kinetic Mesh Wireless Mesh Networks", Rajant Corporation, Aug. 16, 2018, Retrieved from the Internet https://rajant.com/technology/rajant-kinetic-wireless-mesh-networks/ on Dec. 22, 2021.

Markforged, Markforged Materials, Sep. 28, 2018, markforged.com/materials/#onyx, 7 pgs.

International Search Report and Written Opinion for International Application No. PCT/US2018/054017, Search completed Jan. 31, 2019, Mailed Jan. 31, 2019, 17 pgs.

International Preliminary Report on Patentability for International Application No. PCT/US2018/054017, Issued on Apr. 8, 2020, Mailed on Apr. 16, 2020, 12 pgs.

Extended European Search Report for European Application No. 18864524.6, Search completed May 14, 2021, Mailed May 21, 2021, 11 Pgs.

GALCIT AFA; Sep. 18, 2018, 3 pgs.

Achtelik et al., Design of a multi rotor mav with regard to efficiency, dynamics and redundancy; AIAA Guidance, Navigation, and Control Conference, Aug. 13-16, AIA 2012-4779, pp. 1-17, doi: doi.org/10.2514/6.2012-4779.

Alwi et al., Fault tolerant control of an octorotor using Ipv based sliding mode control allocation; American Control Conference, Jun. 17-19, 2013, pp. 6505-6510, doi: 10.1109/ACC.2013.6580859.

Bandyopadhyay et al., Nonlinear attitude control of spacecraft with a large captured object; Journal of Guidance, Control, and Dynamics, Apr. 4, 2016, vol. 39, No. 4, pp. 754-769, doi: 10.2514/1.G001341.

Bry et al., Aggressive flight of fixed-wing and quadrotor aircraft in dense indoor environments; The International Journal of Robotics Research, Mar. 20, 2015, vol. 34, No. 7, pp. 969-1002, doi: 10.1177/0278364914558129.

Choi et al., Optimization of Multi-Package Drone Deliveries Considering Battery Capacity; Presentation at the 2017 TRB 96 27th Annual Meeting, 2016, Optimization of Multi-Package Drone Deliveries Considering Battery Capacity, 16 pgs.

Chowdhury et al., Back-stepping control strategy for stabilization of a tilt-rotor uav; 24th Chinese Control and Decision Conference, May 23-25, 2012, pp. 3475-3480, doi: 10.1109/CCDC.2012.6244555.

Chung et al., Autonomous Flying Ambulance; Aerospace Robotics and Control at Caltech, Sep. 1, 2018, aerospacerobotics.caltech.edu/urban-air-mobility-and-autonomous-flying-cars/, 8 pgs.

Crowther et al., Kinematic analysis and control design for a nonplanar multirotor vehicle; Journal of Guidance, Control, and Dynamics, Jul.-Aug. 2011, vol. 34, No. 4, pp. 1157-1171, doi: 10.2514/1.51186.

Du et al., Controllability Analysis and Degraded Control for a Class of Hexacopters Subject to Rotor Failures; Journal of Intelligent & Robotic Systems, 2015, vol. 78, No. 1, pp. 143-157, doi: 10.1007/s10846-014-0103-0.

Efraim et al., Quadrotor with a dihedral angle: on the effects of tilting the rotors inwards; Journal of Intelligent & Robotic Systems, Jan. 2, 2015, vol. 80, No. 2, pp. 313-324, doi: 10.1007/s10846-015-0176-4.

Enns, Control allocation approaches; "Guidance, Navigation, and Control Conference and Exhibit, 1998, pp. 98-108, doi: 10.2514/6.1998-4109.".

(56)         References Cited

OTHER PUBLICATIONS

Falconi et al., Adaptive fault tolerant control allocation for a hexacopter system; American Control Conference, Jul. 6-8, 2016, pp. 6760-6766, doi: 10.1109/ACC.2016.7526736.

Floreano et al., Science, technology and the future of small autonomous drones; Nature, May 28, 2015, vol. 521, pp. 460-466, doi: 10.1038/nature14542.

Frank et al., Hover, transition, and level flight control design for a single-propeller indoor airplane; AIAA Guidance, Navigation and Control Conference and Exhibit, Aug. 20-23, 2007, doi: https://doi.org/10.2514/6.2007-6318.

Giribet et al., Analysis and design of a tilted rotor hexacopter for fault tolerance; IEEE Transactions on Aerospace and Electronic Systems, Aug. 2016, vol. 52, No. 4, pp. 1555-1567, doi: 10.1109/TAES.2016.140885.

Hermann et al., Nonlinear Controllability and Observability; IEEE Transactions on Automatic Control, Oct. 1977, vol. AC-22, No. 5, pp. 728-740, doi: 10.1109/TAC.1977.1101601.

Holden et al., Uber elevate: Fast-forwarding to a future of on-demand urban air transportation; Uber, Tech. Rep., Oct. 27, 2016, 98 pgs.

Hua et al., A control approach for thrust-propelled underactuated vehicles and its application to vtol drones; IEEE Transactions on Automatic Control, Jul. 24, 2009, vol. 54, No. 8, pp. 1837-1853, doi: 10.1109/TAC.2009.2024569.

Johansen et al., Control allocation a survey; Automatica, May 2013, vol. 49, No. 5, pp. 1087-1103, doi: 10.1016/j.automatica.2013.01.035.

Kalman et al., Contributions to the Theory of Optimal Control; Bol. Soc. Mat. Mexicana, 1960, vol. 5, No. 2, pp. 102-119.

Kaufman et al., Design and Development of a Free-Floating Hexrotor UAV for 6-DOF Maneuvers; IEEE Aerospace Conference, Mar. 1-8, 2014, pp. 1-10, doi: 10.1109/AERO.2014.6836427.

Klumpp; Singularity-free extraction of a quaternion from a direction-cosine matrix; Journal of spacecraft and rockets, Feb. 17, 1976, vol. 13, No. 12, pp. 754-755, doi: 10.2514/3.27947.

Lanzon et al., Flight control of a quadrotor vehicle subsequent to a rotor failure; Journal of Guidance, Control, and Dynamics, Feb. 12, 2014, vol. 37, No. 2, pp. 580-591, doi: 10.2514/1.59869.

Lee, Exponential stability of an attitude tracking control system on so (3) for large-angle rotational maneuvers; Systems & Control Letters, Jan. 2012, vol. 61, No. 1, pp. 231-237, doi: 10.1016/j.sysconle.2011.10.017.

Lee et al., Fault Tolerant Control of Hexacopter for Actuator Faults using Time Delay Control Method; International Journal of Aeronautical and Space Sciences, Jan. 14, 2016, vol. 17, No. 1, pp. 54-63, doi: 10.5139/IJASS.2016.17.1.54.

Meier et al., Pixhawk: A micro aerial vehicle design for autonomous flight using onboard computer vision; Autonomous Robots, Aug. 2012, vol. 33, No. 1-2, pp. 21-39, doi: 10.1007/s10514-012-9281-4.

Mellinger et al., Minimum snap trajectory generation and control for quadrotors; IEEE International Conference on Robotics and Automation, May 9-13, 2011, pp. 2520-2525, doi: 10.1109/ICRA.2011.5980409.

Menon et al., Nonlinear flight test trajectory controllers for aircraft; Journal of Guidance, Control, and Dynamics, Jan.-Feb. 1987, vol. 10, No. 1, pp. 67-72, doi: doi.org/10.2514/3.20182.

Michieletto et al., Control of statically hoverable multi-rotor aerial vehicles and application to rotor-failure robustness for hexarotors; IEEE International Conference on Robotics and Automation, May 29-Jun. 3, 2017, pp. 2747-2752, doi: 10.1109/ICRA.2017.7989320.

Mueller et al., Stability and control of a quadrocopter despite the complete loss of one, two, or three propellers; Robotics and Automation, IEEE International Conference, May 31-Jun. 7, 2014, pp. 45-52, doi: 10.1109/ICRA.2014.6906588.

* cited by examiner

COAXIAL ROTOR PAIR ASSEMBLY WITH VARIABLE COLLECTIVE PITCH ROTOR / PROPELLER FOR FLIGHT VEHICLE OR DRONE

CROSS-REFERENCE TO RELATED APPLICATION

This application claims priority to U.S. Provisional Patent Application No. 63/425,133 entitled COAXIAL ROTOR PAIR ASSEMBLY WITH VARIABLE COLLECTIVE PITCH ROTOR/PROPELLER FOR FLIGHT VEHICLE OR DRONE, filed Nov. 14, 2022, the contents of which are hereby incorporated in its entirety by this reference.

BACKGROUND

Field

The present disclosure is generally related to a coaxial rotor pair assembly having a fixed-pitch rotor and a variable-pitch rotor. Such an assembly may be used in a flight vehicle or drone.

Description of Related Art

Coaxial rotors are pairs of rotors sharing a line of rotation, separated by some distance normal to the rotor planes. The rotors generally spin in counter-rotation. A known advantage of counter-rotation is approximate or complete cancellation of rotor torque. Torque multiplied by rpm is power. If the two rotors are spinning at approximately the same rpm and absorbing approximately the same power, but spin in the opposite direction, then the pair has nearly no net torque. There may be a residual unbalanced torque, if the aerodynamic operating conditions of the two rotors is substantially different.

Common examples are fixed pitch coaxial counter-rotating propellers for drones. This is a way of increasing the rotor cumulative disk-area without increasing the footprint (size) of the drone. More disk area means better aerodynamic efficiency in hover and low-speed flight. In a typical embodiment, each "arm" of the drone has a counter-rotating pair. Since flight control is effected by increasing or decreasing rotor rpm, torque is not fully cancelled unless the rotors comprising the pair are spooled up/down simultaneously. As the drone undergoes different flight environments, such as hover, climb, cruise, descent and so on, the inflow conditions change, and with them the loading on the upper and lower rotors. Unless rpm is individually adjusted, there is no way to cancel upper rotor torque with the lower, at all conditions. Even if rpm is adjusted individually for each respective rotor, because one rotor is partially in the wake of the other rotor in the pair, the distribution of angle of effective angle of attack across the span of each blade, will in general be different between the upper and lower rotor, resulting in torque mismatch, and suboptimal operating conditions.

An alternative is the helicopter rotor coaxial counter-rotating pair. There, both rotors are fully articulated, as is generally the case for helicopter rotors, regardless of disposition. Both rotors typically have fixed common rpm, but have independent collective and cyclic pitch. Collective pitch allows each rotor's blade-set to be positioned such as to achieve nearly optimal angle of attack distribution along each blade. If torque is not fully cancelled, an auxiliary rotor, such as a tail-rotor, may be necessary. Cyclic blade angle variation meanwhile allows for different blade angle as the blade in question rotates, taking higher or lower values depending on azimuth. This is used for pitch or roll control of the aircraft. Collective pitch variation, however, is generally not used for flight control. While this arrangement may allow for optimization of rotor operating condition, it is done so at the cost of complexity, weight, expense and reliability. For this reason, helicopter-type blades and blade articulation are rarely seen on drones or on the panoply of proposed electrical vertical takeoff and landing aircraft.

Examples of the prior art coaxial counter-rotating drone and helicopter are shown in FIGS. 1 (https://vulcanuay.com/aircraft/) and 2.

In all of these cases, either the rotors are fixed-pitch, precluding adjustment of blade angles for better aerodynamic efficiency or flight control; or they are all fully variable pitch for all blades, with collective and cyclic control, implying the complexity and weight of such systems. There is no middle ground, where aerodynamic efficiency and effective flight control can be realized at moderate cost and complexity. Nor is there a method for rapidly varying rotor blade collective pitch, as a flight control device.

SUMMARY

It is an aspect of this disclosure to provide a coaxial rotor pair assembly, e.g., for a flight vehicle. The coaxial rotor pair assembly comprises a fixed-pitch rotor comprising a plurality of blades extending in a radial direction, and a variable-pitch rotor comprising a plurality of blades extending in a radial direction. The fixed-pitch rotor and the variable-pitch rotor are axially spaced relative to one another on a rotor axis. Further, the fixed-pitch rotor and the variable-pitch rotor are axially aligned along said rotor axis for rotation about the rotor axis via a respective rotor shaft each extending along the rotor axis. A first motor is provided for the fixed-pitch rotor and a second motor is provided for the variable-pitch rotor. The first motor and the second motor are configured to drive the respective rotor about the rotor axis. The first and second motors are each controlled by an associated speed controller which are configured to be controlled by a vehicle flight controller. A collective pitch of the plurality of blades of the variable-pitch rotor is configured to be selectively varied by the vehicle flight controller during rotation of both the fixed-pitch rotor and the variable-pitch rotor about the rotor axis. The plurality of blades of the fixed-pitch rotor are maintained a constant, fixed pitch, e.g., during operation of the flight vehicle.

Another aspect provides a flight vehicle comprising a frame and a plurality of rotors mounted to the frame. Each of the rotors has a motor associated therewith for driving the respective rotor about a rotor axis that extends in an axial direction. Each of the rotors has a number or plurality of blades extending in a radial direction. At least two of said rotors are designed to form a coaxial rotor pair. Each coaxial rotor pair comprises a fixed-pitch rotor and a variable-pitch rotor, the fixed-pitch rotor and the variable-pitch rotor being axially spaced relative to one another on the respective rotor axis and axially aligned along said respective rotor axis for rotation via colinear rotor shafts extending along the rotor axis. The fixed-pitch rotor and the variable-pitch rotor have a first motor and a second motor, respectively, associated therewith for driving the respective rotor about the rotor axis. The flight vehicle also has speed controllers, each of which is configured to drive each of the first motor and the second motor, and controlled by a vehicle flight controller. The vehicle flight controller is further configured to selectively vary a collective pitch of the plurality blades of the variable-pitch rotor during rotation of both the fixed-pitch rotor and the variable-pitch rotor about the rotor axis. The plurality of blades of the fixed-pitch rotor are configured to be maintained in a constant, fixed pitch during operation of the flight vehicle.

Yet another aspect of this disclosure includes a method for controlling the coaxial rotor pair assembly for a flight vehicle as described herein, using the vehicle flight controller. In an embodiment, the method includes: controlling the first motor and the second motor of the fixed-pitch rotor and the variable-pitch rotor; rotating the fixed-pitch rotor and the variable-pitch rotor about the rotor axis via the respective rotor shafts; and controlling and changing the collective pitch of the plurality of blades of the variable-pitch rotor via the vehicle flight controller, wherein the plurality of blades of the fixed-pitch rotor are maintained at the constant, fixed pitch during the controlling and changing of the collective pitch.

Other aspects, features, and advantages of the present disclosure will become apparent from the following detailed description, the accompanying drawings, and the appended claims.

DETAILED DESCRIPTION OF THE PREFERRED EMBODIMENT(S)

Figure 1:
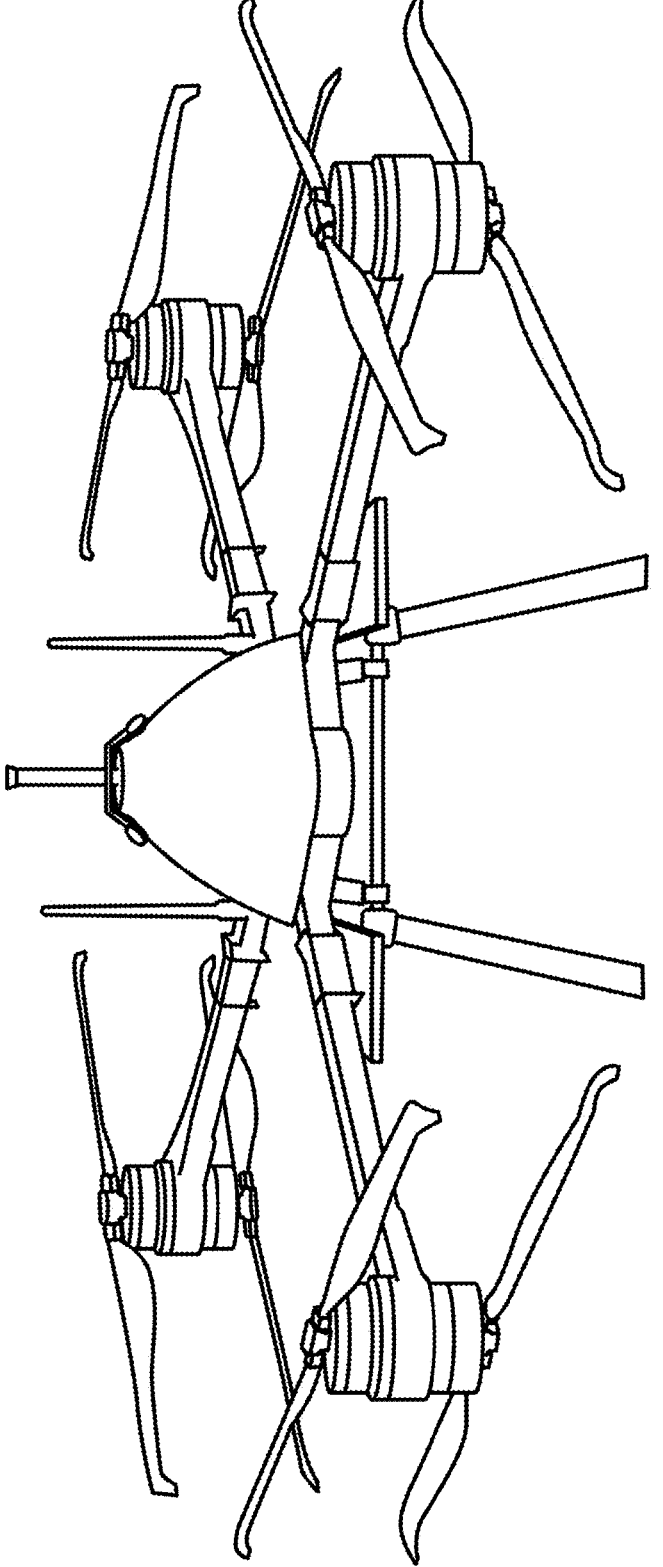
FIG. 1 shows an example of a coaxial counter-rotating fixed pitch propeller multi-copter drone as known in the prior art.
Figure 2:
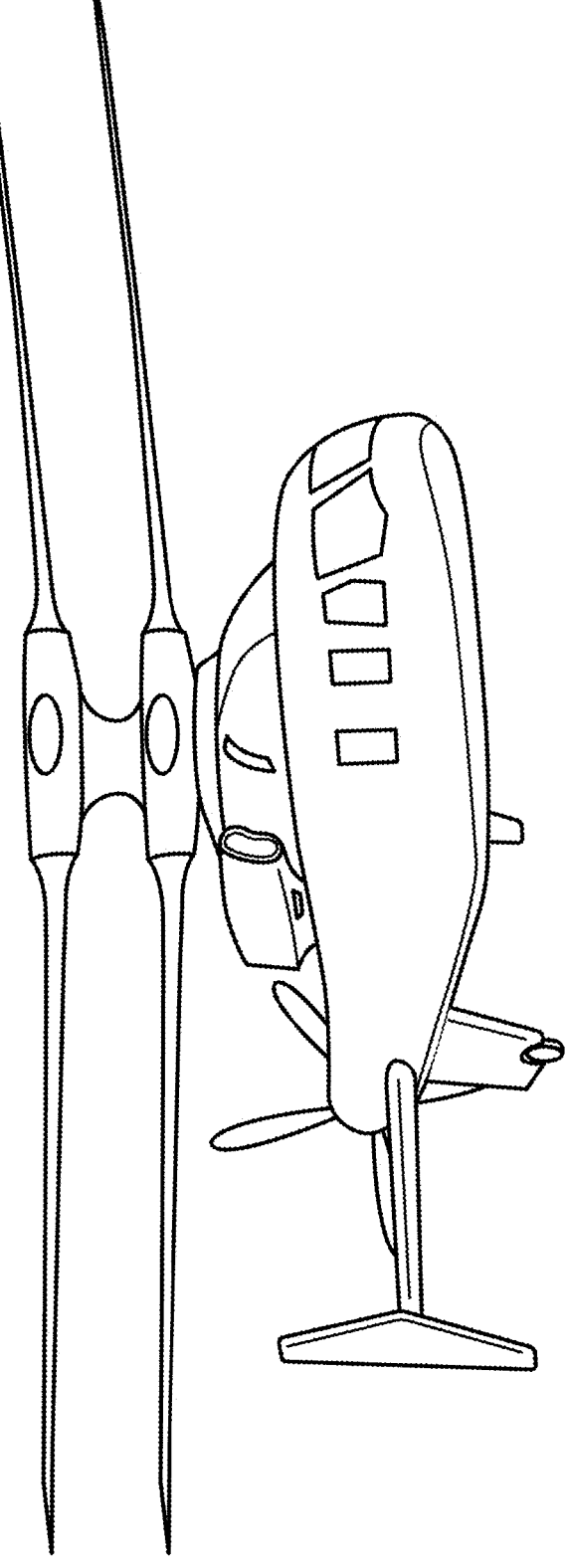
FIG. 2 shows a helicopter with one pair of coaxial counter-rotating variable collective-cyclic rotors as known in the prior art.

As evident by the drawings and below description, this disclosure relates to a pair of rotors, arranged as a coaxial rotor pair, as well as multiple pairs being provided in a vehicle or drone. An even or an odd number of pairs may be provided in the vehicle, as evident below. Each pair includes of a fixed-pitch rotor, which may be provided as a relatively upper rotor in embodiments, and a variable collective pitch rotor, which may be provided as a relatively lower rotor in embodiments.

A coaxial rotor pair assembly 10, e.g., for a flight vehicle 100, drone, or the like, is disclosed in accordance with embodiments. The coaxial rotor pair assembly 10 comprises a fixed-pitch rotor 12 comprising a plurality of blades 20 extending in a radial direction and a variable-pitch rotor 14 comprising a plurality of blades 22 extending in a radial direction. The fixed-pitch rotor 12 and the variable-pitch rotor 14 are axially spaced relative to one another on a rotor axis A-A (i.e., the rotor axis A-A defines an axial direction). Further, the fixed-pitch rotor 12 and the variable-pitch rotor 14 are axially aligned along said rotor axis A-A for rotation about said axis A-A, via a rotor shaft 16, 18 (respectively) extending along the rotor axis A-A. A first motor 24 is provided for the fixed-pitch rotor 12 and a second motor 26 is provided for the variable-pitch rotor 14, in accordance with embodiments. The first motor 24 and the second motor 26 are each configured to drive the respective rotor 12, 14 about the rotor axis A-A. Accordingly, the blades 20, 22 of the rotors 12, 14 are rotated. The first and second motors 24, 26 are controlled by respective speed controllers 30, which in turn is controlled by a vehicle flight controller 31. The speed controllers 30 are generally understood by those skilled in the art and are designed to receive DC power input from a battery and perform high-speed switching to run the associated motor. In the case of electric motors, electronic speed controllers are provided for operating the motors (one controller per motor). The vehicle flight controller 31 is typically provided for the flight vehicle and designed to send signals to each speed controller, as needed, to change rpm, for example. The flight vehicle also has a flight controller configured to drive any and all actuators associated with the vehicle, to include in particular each of the first motor and the second motor. As described later, such a flight controller 31 may be mounted to a frame 28 that is part of a flight vehicle or drone, in accordance with embodiments herein.

Figure 7:
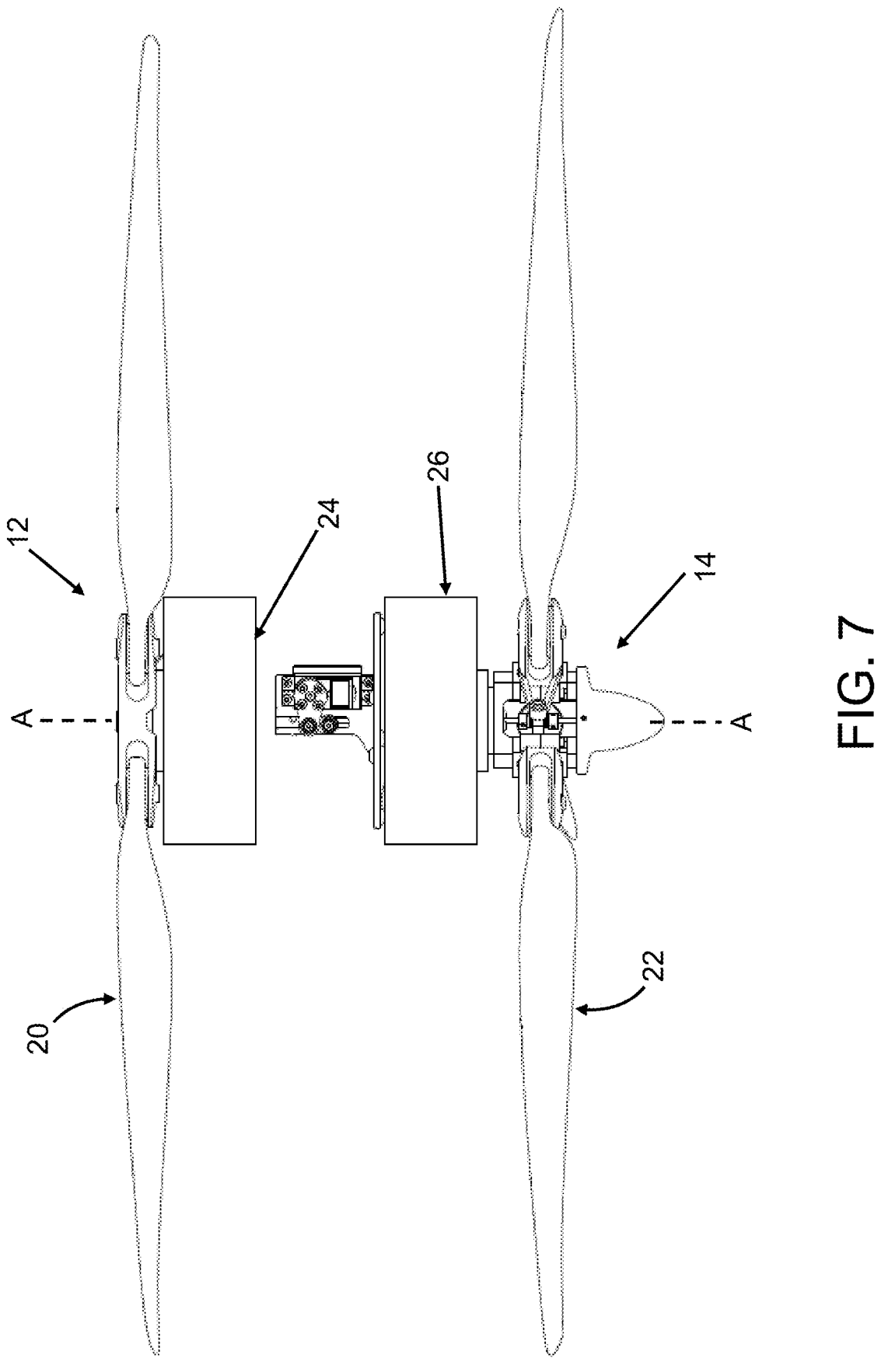
FIG. 7 shows an example of a variable coaxial rotor pair in accordance with an embodiment of this disclosure, showing a lower (variable-pitch) rotor at zero degree collective pitch.
Figure 8:
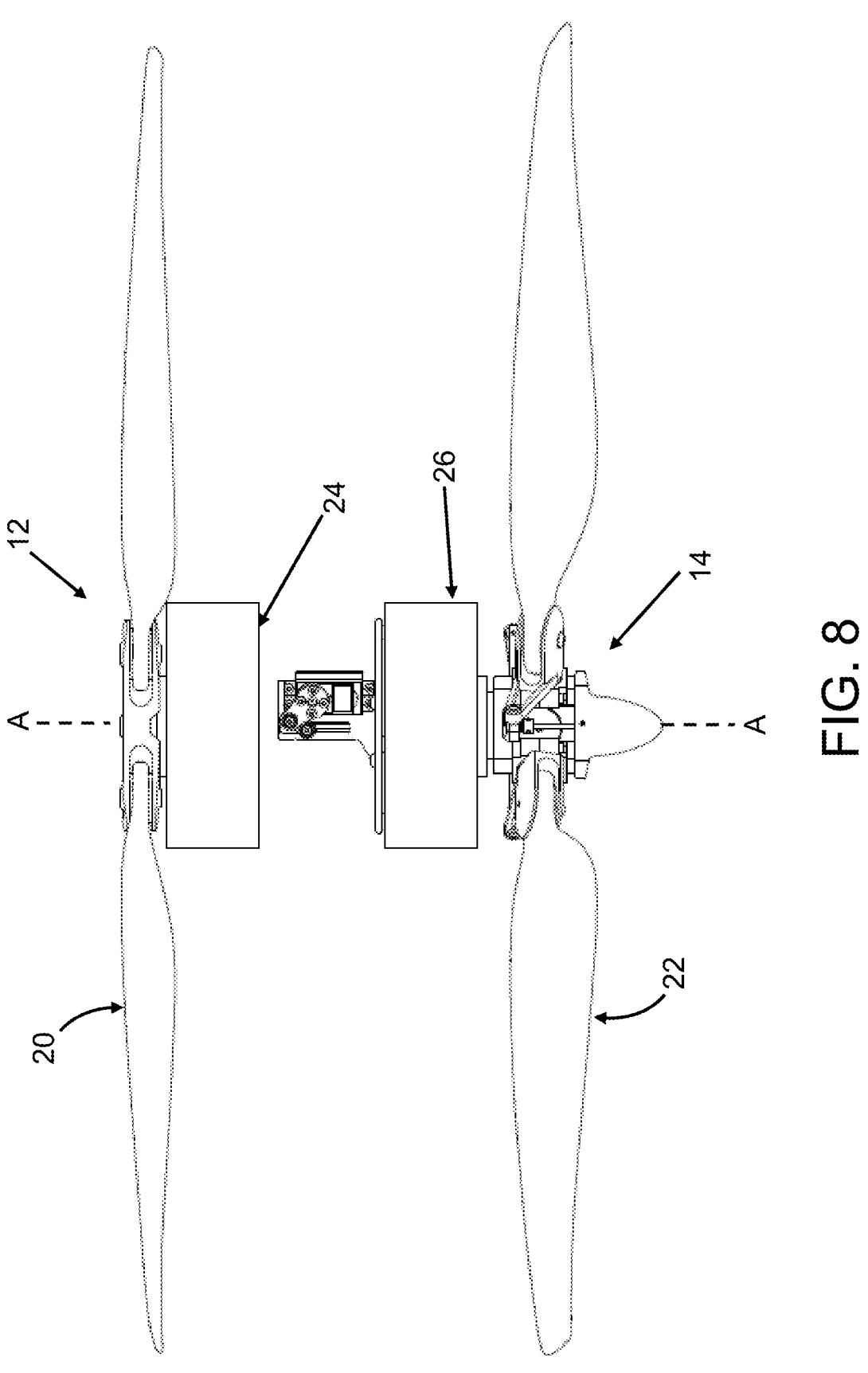
FIG. 8 shows an example of a variable coaxial rotor pair in accordance with an embodiment of this disclosure, showing a lower (variable-pitch) rotor at +20 degree collective pitch.
Figure 9:
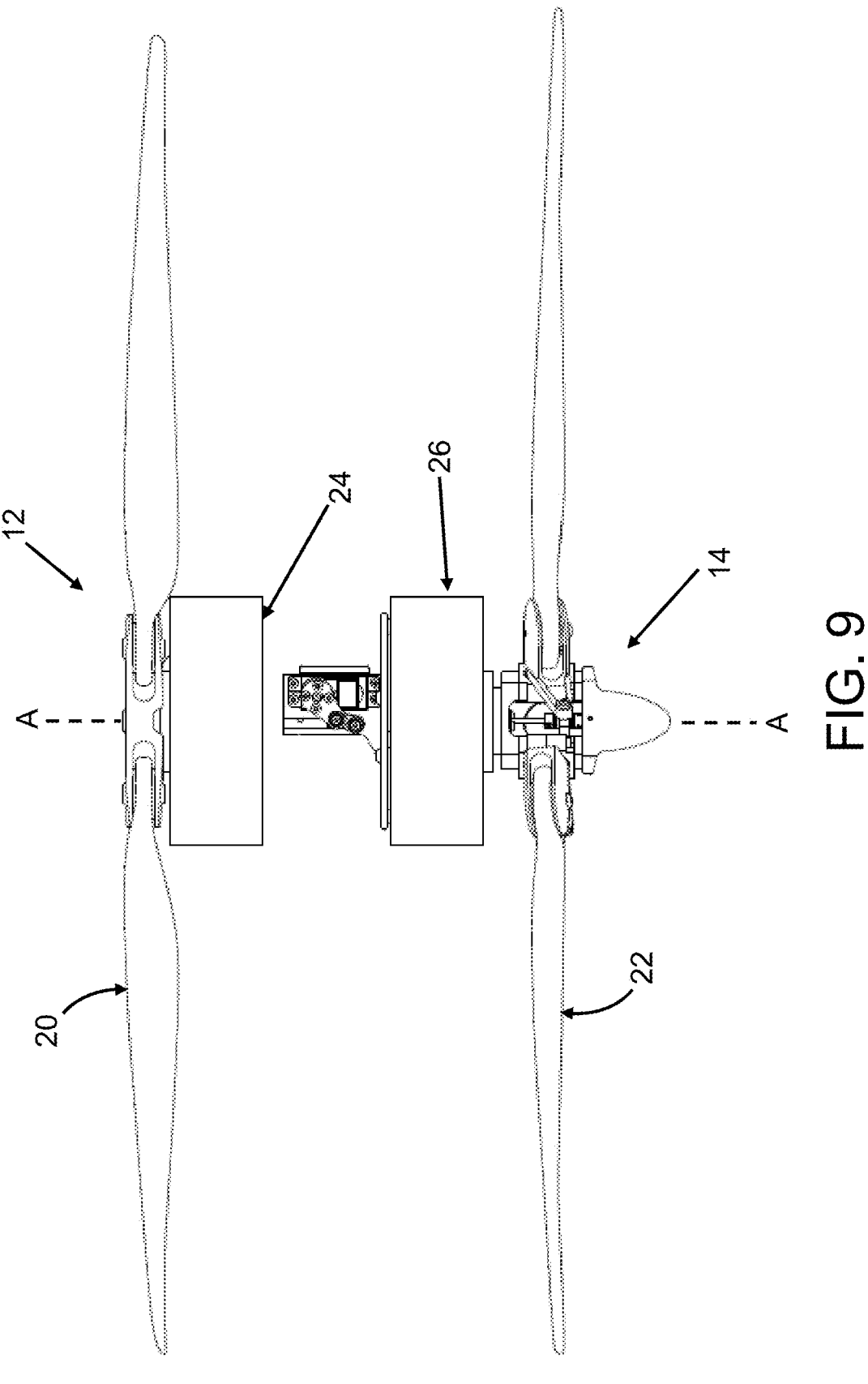
FIG. 9 shows an example of a variable coaxial rotor pair in accordance with an embodiment of this disclosure, showing a lower (variable-pitch) rotor at −10 degree collective pitch.

As understood by those skilled in the art, the blades 20, 22 are set at blade collective pitch (also referred to herein simply as "pitch"), i.e., an angle, with regards to their respective rotor shafts 16, 18. In accordance with embodiments of this disclosure, the blades 20 of the fixed-pitch rotor 12 are maintained a constant, fixed pitch during rotation about the rotor axis A-A. In embodiments, a collective pitch of the blades 22 of the variable-pitch rotor 14 is configured to be collectively and selectively varied by the vehicle flight controller 31 during rotation of both the fixed-pitch rotor 12 and the variable-pitch rotor 14 about the rotor axis A-A. Herein, and as generally understood by those of skill in the art, a "collective pitch" of the blades 22 refers to a blade angle at which all of the blades 22 are set or positioned in the variable-pitch rotor 14. As will be understood via this description, then, a blade pitch angle of each/all the blades 22 may be varied or changed between at least a first angle and a second angle, to vary the collective pitch of the variable-pitch rotor 14. That is, the angles or pitches of each/all of the blades 22 are changed collectively by rotating the blades substantially equally, resulting in a collective-pitch angle change at the propeller/rotor. In accordance with embodiments, then, the vehicle flight controller 31 is configured to selectively provide collective pitch control of the variable-pitch rotor 14, i.e., selectively vary or change a pitch angle of each of the blades 22 such that the blades 22 are all set at the same pitch, during rotation of both the fixed-pitch rotor and the variable-pitch rotor about the rotor axis A-A, i.e., during flight of a vehicle, while the blades 20 of the fixed-pitch rotor 12 are maintained at their constant, fixed pitch. FIGS. 7-9, described in detail later below, show examples of a variable coaxial rotor pair in accordance with embodiments of this disclosure, showing a lower (variable-pitch) rotor different collective pitches.

Using a single variable-pitch rotor in the coaxial rotor pair assembly 10 as disclosed herein is mechanically simpler and lighter-weight than putting, for example, variable pitch on both upper and lower rotors. The assembly 10 is also aerodynamically more robust as compared to a fixed pitch rotor pair.

Figure 3A:
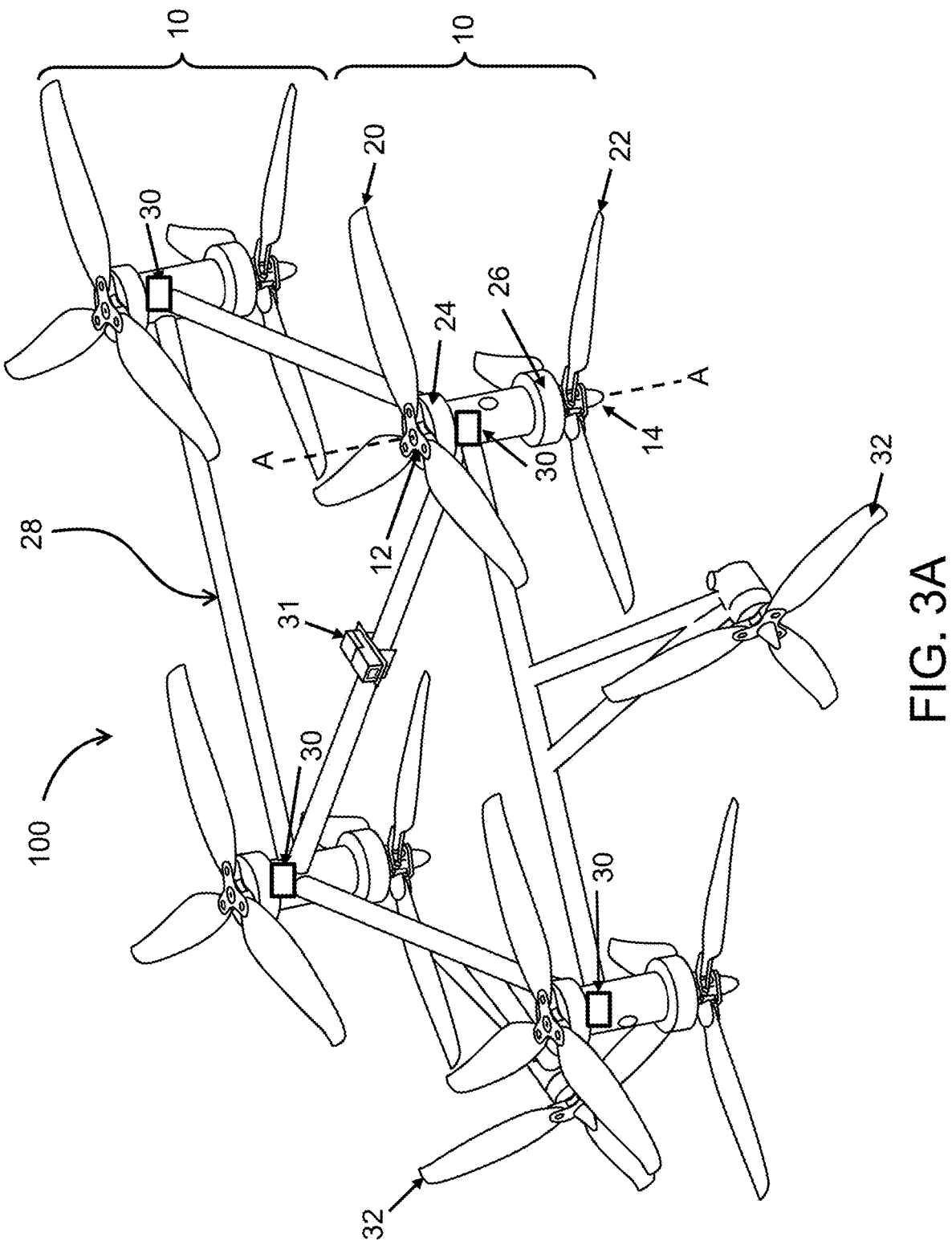
FIG. 3A is an isometric view of an exemplary embodiment of a vehicle including a coaxial rotor pair assembly (ies) in accordance with embodiments herein.
Figure 3B:
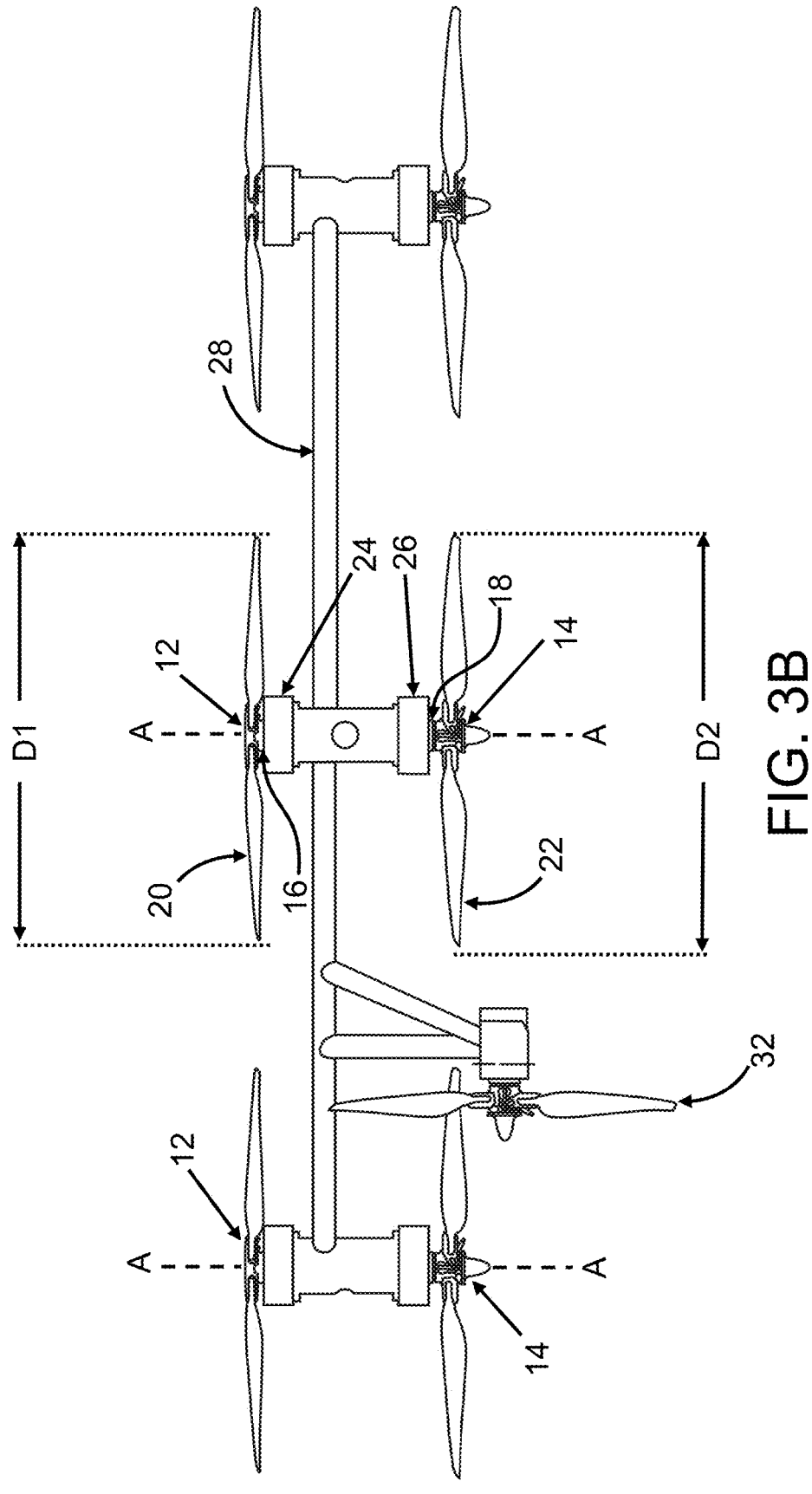
FIG. 3B is a left-side view of the vehicle shown in FIG. 3A.
Figure 4:
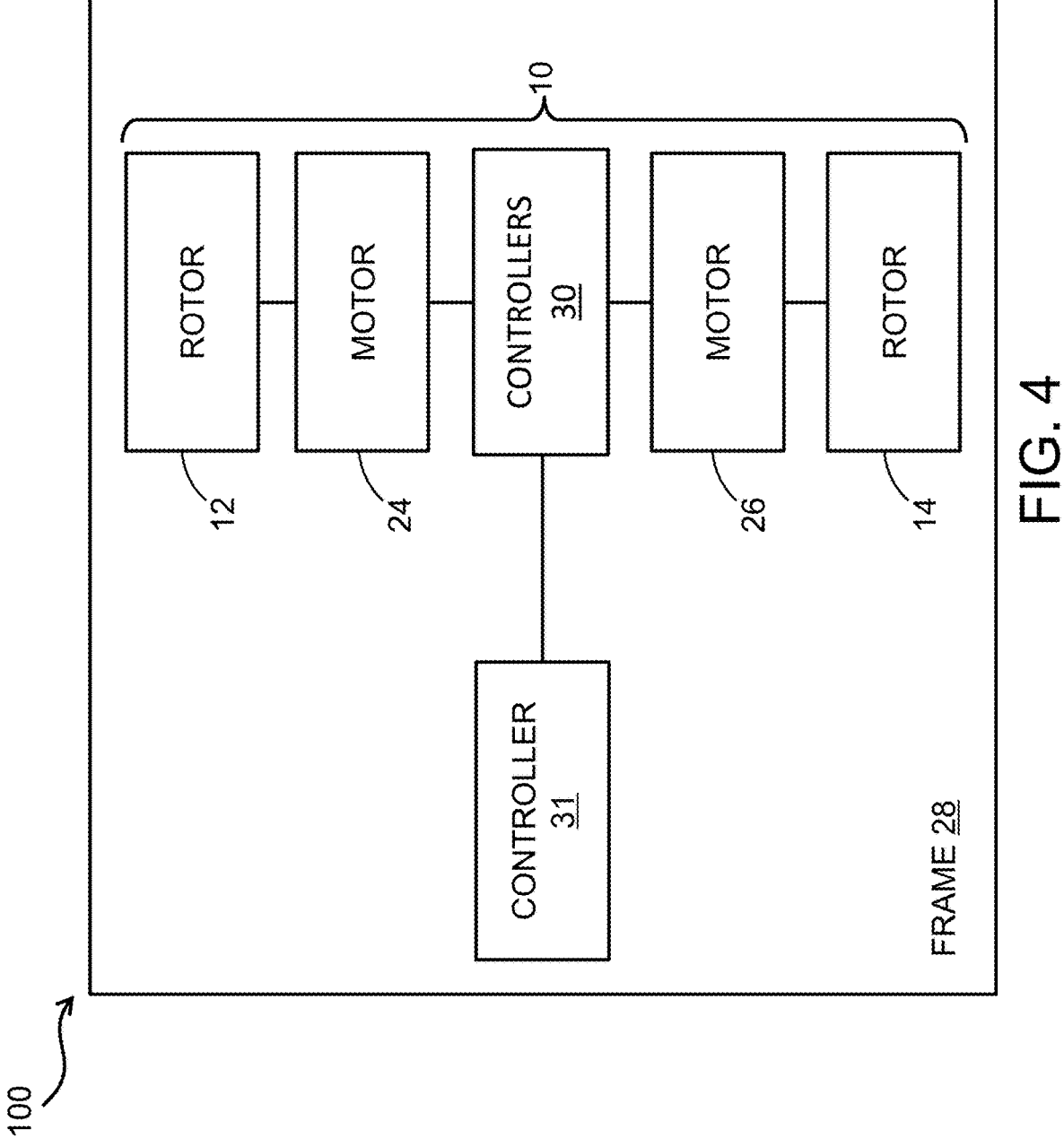
FIG. 4 is a schematic block diagram showing the relationship between parts of the vehicle and the coaxial rotor pair assembly as disclosed herein in accordance with embodiments.

Accordingly, as generally discussed herein, it is within embodiments of this disclosure to provide a flight vehicle with the herein described coaxial rotor pair assembly 10. In embodiments, multiple coaxial rotor pair assemblies 10 may be provided. Generally, as represented in FIGS. 3A and 3B and the schematic of FIG. 4, a flight vehicle 100 may include a frame 28 and a plurality of rotors mounted to the frame 28. Each of the rotors has a motor associated therewith for driving the respective rotor about a rotor axis that extends in an axial direction. Each of rotors has a number of blades extending in a radial direction. At least two of said rotors are designed to form a coaxial rotor pair assembly 10, as described herein. In accordance with embodiments, at least two coaxial rotor pair assemblies 10 are provided in the flight vehicle 100. In embodiments, at least three coaxial rotor pair assemblies 10 are provided in flight vehicle 100. As described previously, each coaxial rotor pair 10 comprises a fixed-pitch rotor 12 and a variable-pitch rotor 14 that are axially spaced relative to one another on the respective rotor axis A-A (see FIG. 3B) and axially aligned along said respective rotor axis A-A for rotation about said axis A-A via a respective rotor shaft 16 and 18 extending along the rotor axis. The fixed-pitch rotor 12 and the variable-pitch rotor 14 have a first motor 24 and a second motor 26, respectively, associated therewith for driving the respective rotor about the rotor axis. The flight vehicle 100 also has multiple speed controllers 30 (schematically represented by a box 30 in FIG. 3A), each speed controller configured to drive each of the first motor 24 and the second motor 26, mounted on its frame 28 (see FIG. 3A). As previously described, vehicle flight controller 31 controls the speed controllers 30 and is further configured to selectively vary a collective pitch of each of the plurality blades 22 of the variable-pitch rotor 14 during rotation of both the fixed-pitch rotor 12 and the variable-pitch rotor 14 about the rotor axis A-A, i.e., during flight. The blades 20 of the fixed-pitch rotor 12 are configured to be maintained in a constant, fixed pitch during operation of the flight vehicle 100.

The rotors provided on the flight vehicle 100 may or may not be a part of a coaxial rotor pair assembly 10. The number of coaxial pair assemblies 10 provided on vehicle 100 is also not limiting. In an embodiment, the vehicle 100 has an even number of coaxial rotor pairs. In another embodiment, the vehicle 100 has an odd number of coaxial rotor pairs. Further, not all of the rotors on vehicle 100 need to be part of a pair. That is, additional rotors or rotor pairs may be provided on vehicle 100. For example, as shown in the exemplary, non-limiting embodiments of FIGS. 3A-3B, an aircraft, drone, or vehicle 100 includes a total of eight lifting rotors that are part of four coaxial pairs 10 and two horizontal thrusters 32, i.e., rotors that are horizontally or perpendicularly mounted (relative to the rotor axis A-A) on frame 28 using arms extending from a base of the frame 28.

By providing a plurality or multiple coaxial rotor pairs 10 in a drone or vehicle 100, a redundancy benefit is provided. For example, during flight, should one of the fixed-pitch rotors 12 fail, the variable pitch rotor 14 of that pair may be configured (via flight controller 31) to be set to higher blade angle setting, to compensate for the loss of thrust. If the variable-pitch rotor 14 fails, the fixed-pitch rotor 12 of that pair may have its speed increased (via flight controller 31) up to higher rpm, again producing compensatory thrust. With the flight controller 31 (or flight control system) being configured to detect such failures in addition to controlling operations of the motors and rotors, the disclosed design is substantially fault-tolerant.

In the exemplary illustration of FIGS. 3A and 3B, each coaxial rotor pair 10 is shown with a fixed-pitch upper rotor, and a lower rotor with variable collective pitch, in accordance with embodiments. That is, in accordance with embodiments, the rotor axis A-A is a substantially vertical axis, wherein the fixed-pitch rotor 12 is provided relatively above the variable-pitch rotor 14 on the substantially vertical axis A-A. According to embodiments, a substantially vertical axis may be approximately 90 degrees+/−10 degrees. Depending on whether the drone/vehicle 100 is in hover, climb, descent or cruise, or other flight regime, the pitch of the variable-pitch rotor 14 may be adjusted such as to produce some performance advantage. The lower rotor pitch can be adjusted to sustain lift even if the upper rotor is stalled, for example in a descent of the drone, or if the upper rotor is operating at too low of a blade angle at to be aerodynamically useful, for example in fast climb. Depending on the aerodynamic loading of the upper rotor, the speed of the airflow beneath it may be high. This results in a condition at the lower rotor, where the effective angle of attack on the plurality of the lower rotor's blades diminishes, thereby adversely affecting the lower rotor's propulsive efficiency. To circumvent this, the lower rotor's pitch may be increased. Thus, keeping the upper rotor fixed-pitch but the lower rotor variable-pitch, allows for good combined efficiency at minimal mechanical complexity.

While FIGS. 3A and 3B show each coaxial rotor pair 10 with a fixed-pitch upper rotor and a lower rotor with variable collective pitch, and the rotor axis A-A as a substantially vertical axis, it should be noted that such illustrations (including the remaining Figures, e.g., FIGS. 7-9) are not intended to be limited to such an arrangement. That is, in accordance with embodiments, the rotor axis may be a substantially horizontal axis A-A, wherein the fixed-pitch rotor 12 is relatively mounted forward with respect to the variable-pitch rotor 14 on the substantially horizontal axis A-A. According to embodiments, a substantially horizontal axis may be approximately 0 degrees+/−10 degrees. In yet another embodiment, the angle of the rotor axis A-A is not limited and may be, for example, an acute angle (relative to zero or a horizontal plane). In still yet another embodiment, the fixed-pitch rotor 12 is relatively mounted in a parallel manner with respect to the variable-pitch rotor 14 on the rotor axis A-A (no matter the angle or position of said axis)

such that the flow direction (or direction of air flow) is directed from the fixed-pitch rotor 12 to the variable-pitch rotor 14. In any of these embodiments, the pitch of the variable-pitch rotor 14 may be adjusted such as to produce some performance advantage, including, for example, sustaining lift, turning the vehicle, and/or maintaining efficiency.

Figure 5:
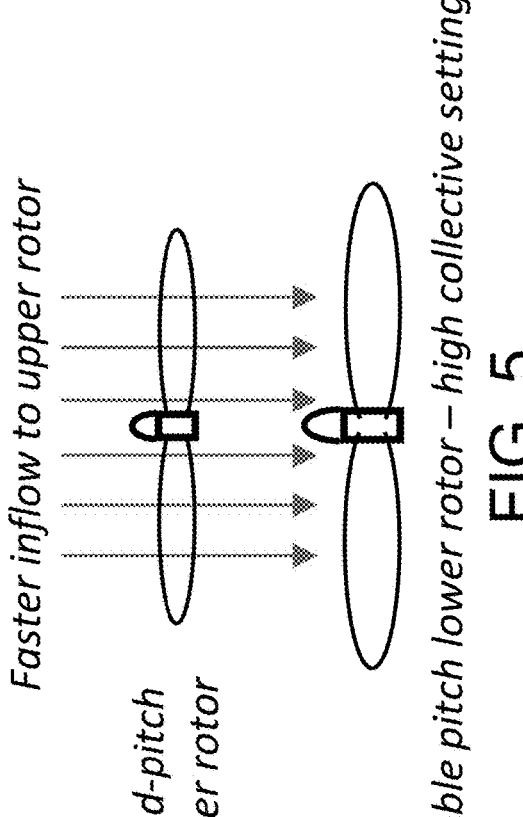
FIGS. 5 and 6 are schematic drawings of a fixed-pitch-variable-pitch coaxial rotor pair in accordance with an embodiment of this disclosure, showing variation in collective pitch for the lower rotor, in a high collective setting and a low collective setting, respectively.
Figure 6:
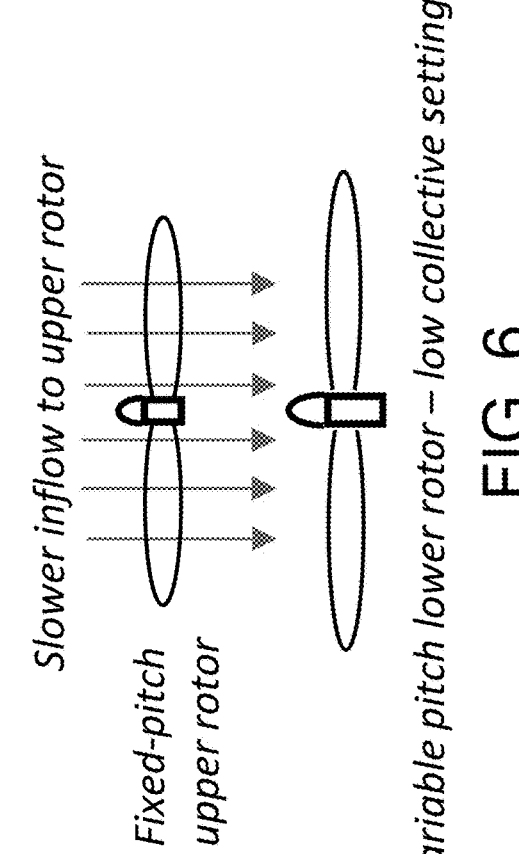

FIGS. 5 and 6 show schematic representations of a coaxial rotor pair assembly 10, where the lower propeller or rotor in a coaxial pair has variable pitch. FIG. 5 illustrates how setting the collective pitch variable-pitch rotor 14 at a high collective setting compensates for the faster flow through the upper or fixed-pitch rotor 12, when said upper rotor is operating at condition of high loading. That is, as the pitch of the variable pitch rotor 14 (when positioned below the fixed-pitch rotor 12 along the axis) is increased, its efficiency in the wake of the upper propeller or fixed-pitch rotor 12 may be increased. As the collective pitch is set to a low collective setting for the variable-pitch rotor 14, as shown in FIG. 6, the variable-pitch rotor 14 is set to operate more efficiently in the case where the upper, fixed-pitch rotor 12 itself has less loading, for example in a condition where the vehicle is descending vertically. In one embodiment, the collective blade angle or the collective pitch of the lower, variable-pitch rotor 14 in the assembly 10 is intentionally kept low, to allow for large additional angle-range until encountering blade stall at variable-pitch rotor 14. This increases margin for a flight control system that uses variable collective pitch to vary thrust and thus to control the roll or pitch of the drone.

By "high" collective pitch angle setting of the variable-pitch rotor 14, what is meant is a geometric blade angle that is beyond that for aerodynamic stall of said rotor, if the rotor were in isolation in hover, absent the associated fixed-pitch rotor of the coaxial pair. That is, there is advantage to increasing the positive blade angle range of the variable-pitch rotor 14, beyond that which is aerodynamically useful for example in ground-test in a hover-chamber. By "low" collective pitch angle setting of the variable-pitch rotor 14, what is meant is a geometric blade angle that if the rotor were in isolation in hover, absent the associated fixed-pitch rotor of the coaxial pair, would result in substantially zero thrust produced, regardless of the rotational speed of the rotor.

According to an embodiment, a "high" collective setting refers to +20 degrees from a set or standard collective pitch setting and a "low" collective setting refers to −10 degrees from a set or standard collective pitch setting for the blades. For example, FIG. 7 shows an example of a variable coaxial rotor pair, showing a lower (variable-pitch) rotor 14 with its blades 22 at zero degree collective pitch, i.e., a set or default pitch for the blades, e.g., a factory incidence angle, wherein the variable pitch coupler is set to put the blades at an orientation identical or nearly identical to that of the factory setting. When the blades 22 of the variable-pitch rotor 14 are set to a high collective pitch, such a pitch may be at +20 degree collective pitch, for example, which is illustrated in FIG. 8. The angle as shown in FIG. 8 may enable the variable-pitch rotor 14 (the lower rotor in this illustration) to be at or just beyond stall in hover, for example. Alternatively, FIG. 9 shows an example of the blades 22 of the variable-pitch 14 rotor at −10 degree collective pitch, i.e., a low collective pitch. Such an angle as shown in FIG. 9 may enable the variable-pitch rotor 14 (the lower rotor in this illustration) to produce zero or nearly zero thrust in hover, for example.

The aforementioned examples of collective pitch settings and depictions in FIGS. 7-9 are not intended to be limiting. It should be understood that the collective pitch settings may be +/−20 degrees and/or +/−10 degrees from a set or standard pitch (e.g., from zero degrees), including degrees therebetween (e.g., +/−15 degrees, +/−5 degrees).

In another embodiment, the high collective setting may be +20 degrees and the low collective setting may be −20 degrees from a set or standard collective pitch setting for the blades. In an embodiment, the set or standard collective pitch may be approximately zero degrees relative to a horizontal plane. In another embodiment, the set or standard collective pitch may be approximately zero degrees relative to a vertical plane. In one embodiment, the set or standard collective pitch may be approximately zero degrees, with the high collective setting of +10 degrees and the low collective setting of −10 degrees from a set or standard collective pitch setting for the blades.

Figure 10:
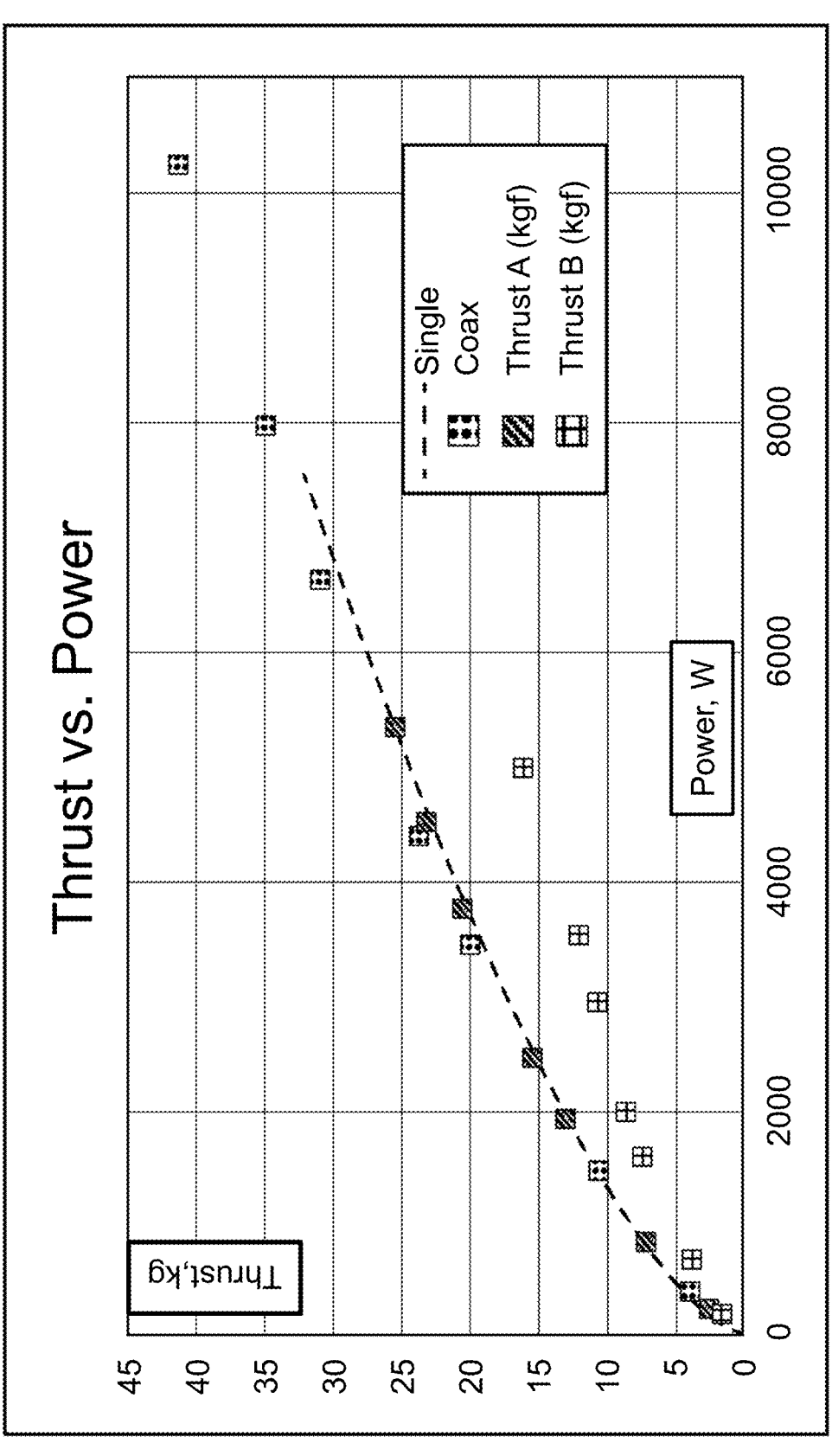
FIG. 10 shows testing results of a fixed-pitch propeller in a graph of thrust versus power required for a single propeller, an upper propeller and a lower propeller in a coaxial arrangement of rotors, and the coaxial pair.
Figure 11:
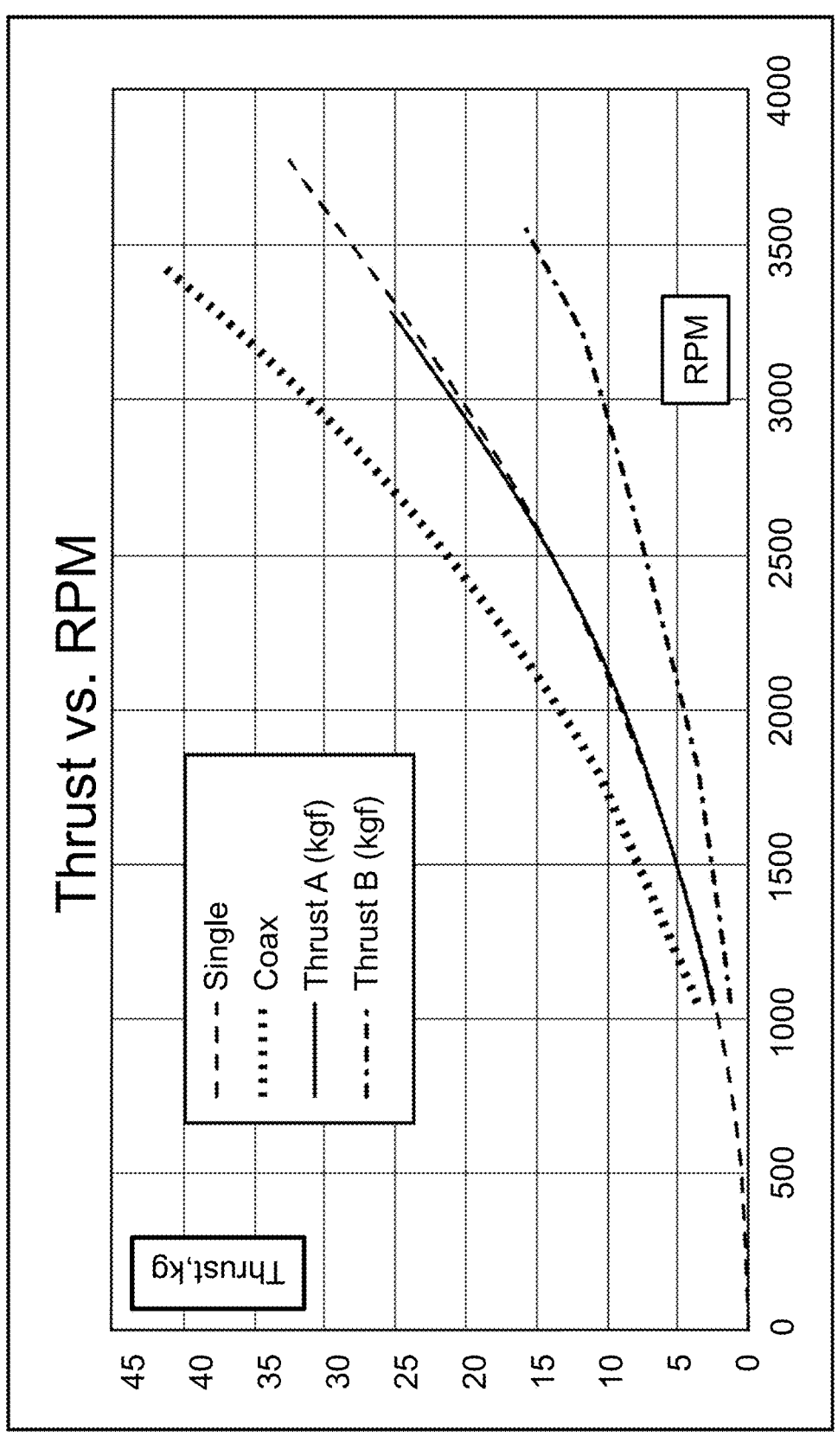
FIG. 11 shows testing results of a fixed-pitch propeller in a graph of thrust versus rotational speed (rpm measurements) for the single propeller and coaxial arrangement of rotors of FIG. 10.

Another example of benefits of a variable collective pitch rotor 14 being provided as a lower rotor in a coaxial rotor pair assembly 10, and thus a fixed-pitch rotor 12 as the upper rotor, may be seen and deduced from thrust-stand testing of a fixed-pitch propeller on an actual propeller pair of the prior art having both fixed pitch propellers/rotors as compared to results utilizing a single propeller. The results of such testing are shown in FIGS. 10 and 11. FIG. 10 shows results of thrust versus power required, and thus, a measure of efficiency for a fixed-pitch propeller; FIG. 11 shows results of thrust versus rotational speed (rpm measurements) for a fixed-pitch propeller. Here, in addition to the propellers/rotors being fixed-pitch, both upper and rotor propellers were identical, except for being in counter-rotation and hence cambered/twisted accordingly, during testing and measurement taking. As shown (when comparing the upper propeller to a single propeller), the upper propeller is almost unaffected by the lower propeller. The lower propeller sustains nearly a 50% reduction in its thrust production for a given rotational speed. This is because of the slipstream of the upper propeller. The effect on the lower propeller is as if it were flying forward (normal to its plane of rotation) at a cruise speed, equal to the wake-speed of the upper propeller. However, the efficiency of the pair of propellers, even in this configuration, is better, than if one single propeller were to have been spinning fast enough, to attain double the thrust. Accordingly, in order to further improve the effectiveness of a coaxial rotor pair, and in view of these testing results, it may be deduced that providing a variable-pitch rotor as a lower rotor in a coaxial rotor pair assembly, with a fixed-pitch upper rotor, may be produce such results and additional advantages.

Figure 12:
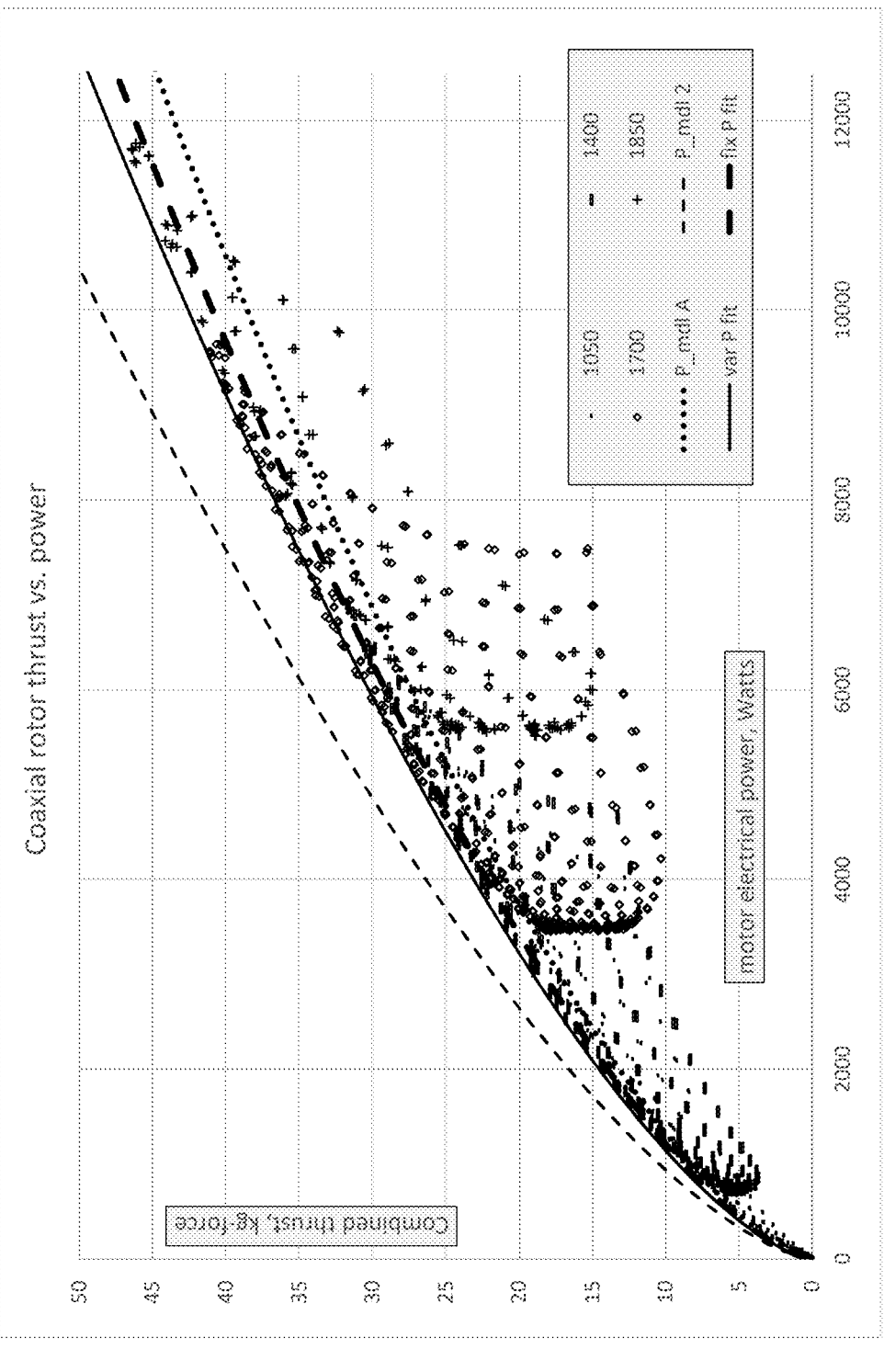
FIG. 12 shows testing results of the disclosed arrangement in a graph of thrust versus power required for a pair of motors spinning the coaxial rotor pair.

For comparison, FIG. 12 shows testing results of the disclosed arrangement in a graph of thrust versus power required, and thus, a measure of efficiency for a coaxial rotor pair assembly 10, for a pair of motors spinning the coaxial rotor pair. Here, the upper or top rotor has/had fixed pitch, and the lower or bottom rotor has/had variable collective pitch, and placed as a set coaxially and parallel to the plane of the other, for experimental testing and measurement taking. The spacing between the fixed pitch rotor and the variable collective pitch rotor is/was fixed. In the experiment, the blades for the fixed pitch rotor and the variable collective pitch rotor are identical, except that for the fixed pitch rotor, they are mutually rigidly coupled to each other, that is, in fixed-pitch; whereas in the variable collective pitch rotor, the blades are each movable along their respective spanwise axis, in unison; that is, in variable collective pitch. There is a pitch-setting for the variable collective pitch rotor, which is functionally identical to that of the fixed pitch rotor. Accordingly, this may be referred to as the functionally fixed-pitch version of the lower/bottom variable collective pitch rotor.

In the experiment, the rotational speed or rpm of both the fixed pitch rotor and the variable collective pitch rotor is varied: the rpm of the fixed pitch rotor is set to some setting, between its highest and lowest point, inclusive; that of the variable collective pitch rotor is varied, from its highest to its lowest point, inclusive, for some collective pitch setting of the variable collective pitch rotor. This is repeating, keeping the rpm for the fixed pitch rotor and the variable collective pitch rotor, and varying the collective pitch of the variable collective pitch rotor, from its minimal to its maximal setting. Then still the rpm of the fixed pitch rotor is unchanged, while that of the variable collective pitch rotor is put to the next setting, for which again, the collective pitch of the variable collective pitch rotor is varied from the lowest to the highest setting. This continues for the same rpm setting of the fixed pitch rotor, until the full range of rpm and collective pitch of the variable collective pitch rotor is swept. Then, the next setting of the rpm of the fixed pitch rotor is chosen, and all of the foregoing is repeated. The experiment continues across all settings of the rpm of the fixed pitch rotor, from lowest to highest, such that for each rpm of the fixed pitch rotor, the rpm range and collective pitch range of the variable collective pitch rotor is swept.

It is customary to plot the thrust produced by the rotor pair, vs. the necessary input-power to the pair. In FIG. 12 there is shown a scatter plot of thrust, in kilograms-force, vs. power, in Watts input into the electric motors driving the rotors; the motors are identical, one per respective rotor.

Classical momentum theory for a rotor as an actuator disk, says that the power-required goes as the three-halves exponent of the thrust produced; reversing this, as in FIG. 12, the thrust goes as the two-thirds exponent of the power. This is true whether there is a single rotor, or two rotors taken separately, or two rotors in close mutual proximity, the only difference being, the proportionality-constant or factor of inefficiency, that converts the proportionality-relation between thrust and power, into an actual equation. Classical momentum theory is an idealization, meaning a best-case or envelope of thrust-produced vs. power required. No realizable test-case will be better, or above the theoretical curve of thrust vs. power.

FIG. 12 includes a scatter plot of all of the variations in the above-described experiment, namely variations in rpm for the fixed pitch rotor and the variable collective pitch rotor, and collective pitch for the variable collective pitch rotor. Some variations result in poor thrust vs. power. None exceed the solid line labeled "var P fit" in FIG. 12. This is a curve-fit to the best realized variations of rpm and variable collective pitch.

The dotted curve labeled "P_mdl A" in FIG. 12 is a fit to the best thrust vs. power for a single rotor. This would be the case if one of the rotors in the coaxial pair, either the fixed pitch rotor or the variable collective pitch rotor, would be idling, where its rpm is so low, that the thrust that is produces is nearly zero. Then the other rotor would carry all of the thrust attributable to the coaxial pair. By raising the rpm of this rotor, more thrust is possible, but at the cost of more power. That the P_mdl A dotted curve lies below the var P fit solid curve of FIG. 12, is testament to the efficiency benefit of having a coaxial pair, vs. just a single rotor. However, consider the dashed curve labeled "P_mdl 2" in FIG. 12. This is the thrust available vs. power, if it had been the case, that there were two separate rotors, not in a coaxial pair, but completely separate from each other. That the P_mdl 2 dashed curve is so far above all of the other curves, and the scatter plot, is testament to the efficiency penalty of putting the two rotors in a coaxial pair, vs. having two completely separate rotors. The advantage of a coaxial pair, as is well-known, is more compact packaging. The efficiency disadvantage vs. two distinct separate rotors, is also well-known, and is consistent with classical momentum theory.

The benefit of variable collective pitch on the variable collective pitch rotor is the difference between the var P fit solid curve in FIG. 12, and the bolded dashed curve labeled "fix P fit". The fit P fit dashed curve is the bounding envelope of thrust vs. power for the coaxial pair, if the variable collective pitch rotor is in its functionally fixed-pitch version; that is, if the variable collective pitch rotor did not have variable collective pitch. On the other hand, the performance of the fixed pitch rotor is unaffected by the presence or absence of variable collective pitch in the variable collective pitch rotor. Improvement in efficiency of the coaxial pair as a whole, is from variable collective pitch on the variable collective pitch rotor.

Still, while providing variable-pitch rotor 14 as a lower rotor in coaxial pair has been realized, this disclosure is not limited to such a configuration. In other embodiments, the reverse may be provided in a pair, i.e., the fixed-pitch rotor 12 is provided relatively below the variable-pitch rotor 14 on the substantially vertical axis A-A, so that upper rotor of a pair is variable collective pitch, but the lower rotor is a fixed pitch.

In one embodiment, the coaxial rotors 12, 14 of the assembly 10 are counter-rotating, i.e., configured to counter-rotate relative to one another about the rotor axis A-A. In another embodiment, the fixed-pitch rotor 12 and the variable-pitch rotor 14 are configured to co-rotate about the rotor axis A-A; that is, the rotors 12, 14 are configured to spin or rotate in the same direction. This precludes torque-cancellation for the pair, but in a configuration wherein variable pitch is provided on the lower rotor, the efficiency of the rotor pair may be higher than if all of the blades of both rotors were to be put into one plane, which is to say, a higher-solidity single rotor.

In embodiments, the fixed-pitch rotor 12 has a first number of blades 20 and the variable-pitch rotor 14 has a second number of blades 22. In an embodiment, the second number of blades 22 of the variable-pitch rotor 14 is less than the first number of blades 20 of the fixed-pitch rotor 12. For example, if variable-pitch rotor 14 is provided as the lower rotor in a coaxial pair, then fewer blades 22 may reduce the complexity of the assembly 10, which typically requires one linkage per blade. Net torque may still be zero for the pair, by running the lower, variable-pitch rotor 14 at higher blade angle and/or higher rotational speed than the upper, fixed-pitch rotor 12, and thus higher thrust and torque per-blade, but approximately equal thrust and/or torque overall.

In another embodiment, the second number of blades 22 of the variable-fixed rotor 14 is greater than the first number of blades 20 of the fixed-pitch rotor 12. In yet another embodiment, the first number of blades 20 and the second number of blades 22 are equal. The number of blades 20 and/or 22 is not intended to be limiting. In an embodiment, each of the rotors 12 and 14 have at least two blades 20 and 22. In one embodiment, each of the rotors 12 and 14 have at least three blades 20 and 22.

According to embodiments herein, the fixed-pitch rotor 12 has a first diameter D1 (see FIG. 3B) defined by a span of the blades associated therewith and the variable-pitch rotor 14 has a second diameter D2 defined by a span of the blades associated therewith. In an embodiment, the second diameter D2 of the variable-pitch rotor 14 is larger than the first diameter D1 of the fixed-pitch rotor 12. In an embodiment, the first diameter D1 and the second diameter D2 are substantially equal.

In one embodiment wherein the variable-pitch rotor 14 is provided as a lower rotor of a coaxial rotor pair 10, this lower rotor may be of larger diameter than the upper, fixed-pitch rotor 12, thereby taking advantage of partial inflow undisturbed by the wake of the upper rotor, and thus improving overall aerodynamic efficiency of the rotor pair. The collective pitch of the lower, variable-pitch rotor 14 may be adjusted to take maximal advantage of the difference in inflow between the core-portion of the lower rotor, which is in the wake of the upper rotor 12, and the "free" portion, which is in clean-air.

In one embodiment, the two rotors 12, 14 are of equal diameter, blade count and solidity. The blades could be of the same geometry (airfoil sections, twist distribution and chord distribution) in accordance with embodiments.

In yet another embodiment, the diameter of the variable-pitch rotor 14 is smaller than the diameter of the fixed-pitch rotor 12 when positioned there-below. It is known that a wake of the upper (fixed) rotor contracts and is smaller than the rotor diameter. Accordingly, if the variable pitch rotor 14 has a smaller diameter, then all of it will be in the wake. While typically using a smaller diameter rotor below a larger rotor would be considered undesirable with regards to negatively affecting aerodynamic efficiency, herein, because the entire lower variable-pitch rotor 14 is now fully in the wake of the upper, fixed-pitch rotor 12, the blades of the variable-pitch rotor 14 may be designed or shaped in order to operate effectively and in consideration of the arrangement to compensate for such loss.

The mechanisms and/or device for adjusting or varying the pitch of the blades 22 of the variable-pitch rotor 14 is not intended to be limiting. In one embodiment, a mechanism is provided with a mounting of the rotors 12, 14 and utilizes a servomotor for angle adjustment. In an embodiment, the mechanism for varying pitch may be a mechanism as described in U.S. Provisional Patent App. No. 63/425,047, filed on the same day as this application, entitled, "Collective Pitch Adjustment Mechanism for Variable-Pitch Propeller or Rotor Utilized in a Flight Vehicle or Drone".

The vehicle flight controller 31 associated with the vehicle 100 includes one or more processors and one or more sensors to measure and record the vehicle state, which includes speeds, positions in space, linear and angular accelerations and rates, etc., for example. Further, vehicle flight controller 31 includes both hardware and software associated therewith; e.g., hardware to process sensor data and to control the vehicle 100, and software to run on the hardware, e.g., to issue commands to a plurality of coaxial fixed-pitch variable-pitch rotor pairs 10, where in one rotor is fixed pitch (vary the rotational speed) and one rotor is variable pitch (vary the blade collective pitch, and if desired, also the rotational speed).

As a result, the vehicle flight controller 31 (and its processors, sensors, etc.) may be used to implement a method for controlling each coaxial rotor pair assembly 10 for a flight vehicle—as well as the vehicle 100 itself—as described herein. In an embodiment, the method includes: controlling the first motor 24 and the second motor 26, respectively, of the fixed-pitch rotor 12 and the variable-pitch rotor 14; rotating the fixed-pitch rotor 12 and the variable-pitch rotor 14 about the rotor axis A-A via the rotor shafts 16 and 18 (respectively); and controlling and changing, collectively, the collective pitch of all of the blades 22 of the variable-pitch rotor 14 via the vehicle flight controller 31, wherein the blades 20 of the fixed-pitch rotor 12 are maintained at the constant, fixed pitch during the controlling and changing of the collective pitch.

In some embodiments, the method may include the controller 31 controlling the collective pitch of the blades 22 of the variable-pitch rotor 14 for one or more pair assemblies 10 provided in a vehicle.

The controller 31 is configured to control actuators associated with a plurality of coaxial rotor fixed-pitch-variable-pitch pairs, to provide a desired outcome during operation of a vehicle.

As generally understood by one skilled in the art, and thus not discussed in great detail herein, the vehicle flight controller 31 is designed to control speed controllers 30 as well as any number of actuators associated with the system based on received inputs. Inputs may be from any number of devices, including, but not limited to, sensors, altimeters, cameras, thermal devices, accelerometers, gyroscopes, magnetometers, barometers, GPS sensors, pressure sensing devices, etc. A typical automatic flight controller is designed to sense an approximation to the vehicle "state". Per practices already known in the art, vehicle flight controllers may reconstruct from potentially noisy and/or undersampled and/or incomplete sensed approximate state, to the full state, necessary to physically describe the vehicle. Typical data comprising the full state may include: vehicle rigid-body position in space, speed in all translational and rotational directions; position with respect to the ground and/or obstacles; acceleration of the vehicle in all rotational and translational directions; rotational speed of all individual rotors; and blade angle of all variable pitch individual rotors, as example. The vehicle state is used by the vehicle flight controller to calculate as an ongoing function of time, the inputs to the vehicle actuators, to (1) stabilize and trim the vehicle, (2) direct the vehicle along some target direction and speed, and (3) advance the target direction and speed to prosecute some desired flight-mission, whether commanded by the pilot, pre-programmed or altered automatically, for example.

In practices already known in the art, the vehicle flight controller feeds signals to each actuator or any combination of actuators in the set of actuators that are associated with the vehicle 10. As a result, the vehicle flight controller may be configured like known controllers which combine the measurement(s) of the approximate vehicle state, calculate a better approximation for the full vehicle state, and based on that and on inputs from the pilot or automatically, send signals to the actuators. The controller also monitors the response of the actuators and makes corrections if the actuators over-respond or under-respond.

In one embodiment herein, actuators (and input) to the vehicle flight controller 31 may include the rotational speed of any rotor 12, 14, and the blade angle of blades 20, 22 of any rotor. For a fixed-pitch-variable-pitch coaxial pair of rotors, one embodiment of actuation may be to vary the collective pitch of the variable pitch rotor 14, keeping all other properties of the rotor pair constant. In an exemplary embodiment, varying the collective pitch of blades 22 may be implemented, for example, when a very fast transient is needed, and actuator bandwidth is critical. Such occurs for example when a cargo-carrying drone drops the cargo mid-flight, and it is necessary to avoid the drone suddenly gaining altitude from the sudden reduction in total vehicle weight. In another embodiment, the rotational speed of both rotors 12, 14 may be varied along with varying the collective pitch of the variable pitch rotor 14. In an exemplary embodiment, for example, when it is desired to slow down from a fast cruising speed to a slower one, both the speeds of rotors 12, 14 and the collective pitch of blades 22 may be varied. At slower speeds, it is known that the rotor power must be increased, to sustain the same weight carrying capacity, because the inflow speed of the air advancing towards the rotor-planes edgewise, is slower. To maintain equilibrium, the rotor rotational speeds need to increase, and to retain good coaxial pair efficiency, the collective pitch of the rotor downstream or underneath of the fixed-pitch companion rotor (i.e., the variable-pitch rotor) needs to increase. In yet another embodiment, there may be two pairs of coaxial fixed-pitch-variable-pitch rotors, a port-side and a starboard-side with respect to the vehicle. In such an embodiment, the controller 31 may be configured to increase the collective pitch of the variable-pitch rotor in the port-side, while the collective pitch of the variable-pitch rotor in the starboard side is decreased via controller 31. The resulting thrust imbalance causes a rolling-moment, rolling the entire vehicle. But the net thrust across the two pairs of fixed-pitch-variable-pitch rotor pairs is unchanged. Accordingly, this provides an example of a signal to the actuators that the controller 31 would feed to effect a roll of the vehicle, for example, to turn.

In embodiments, the method of controlling via the vehicle flight controller 31 may include detecting failure of the fixed-pitch rotor 12 and adjusting the collective pitch of the variable-pitch rotor 14 such that the blades 22 are provided at a relatively higher setting, to compensate for loss of thrust. In embodiments, the method of controlling via the flight controller 31 may include detecting failure of the variable-pitch rotor 14 and adjusting a rotational speed of the fixed-pitch rotor 12, via its motor 24, to a relatively higher speed, to compensate for loss of thrust. For example, if a respective motor of a particular rotor loses power, e.g., if signal to the respective motor electronic speed controller is lost, if the rotor blades or hub fail, or if there is other mechanical of electrical failure, the vehicle flight controller 31 may be configured to issue a command (including adjustment of collective pitch of blades) to compensate for the detection of loss of power. In one embodiment, loss of power signal may be performed by sensing an uncommanded decrease or increase in electrical load (current, voltage) at the respective electronic speed controller 30. In addition, a variable-pitch rotor 14 may fail if its variable pitch mechanism fails. In one embodiment, this is detected by sensing that upon issuing a command from the controller, the electrical load at the respective electronic speed controller does not change (that is, there is no response). In another embodiment, for every rotor, a sensor is provided to detect the respective rotor's rotational speed. If this sensor returns a zero value as input to the controller, and there is an unexpected value or a failure to respond after the controller issues a command to change the respective rotor rotational speed, then a failure is inferred. In these and other cases, one remedy is to bypass the offending electronic speed controller, motor and rotor using the controller 31. In an embodiment, such a bypass may be employed by compensating to give father rotational speed and/or higher collective pitch blade angle to the appropriate plurality of remaining functioning rotors. In one embodiment, wherein the top/upper rotor in a fixed-pitch-variable-pitch pair is fixed pitch, and the bottom/lower rotor is variable pitch, if the variable-pitch rotor fails, the rotational speed of the fixed-pitch rotor may be increased via commands from the controller 31. If the fixed-pitch rotor fails, then either the rotational speed of the variable-pitch rotor, or its blade angle (blades 22), or both, may be increased via commands from the controller 31.

In some embodiments, the vehicle 10 is equipped with elements such as wings, empennages or other flight surfaces, each or in some part equipped respectively with conventional ailerons, rudders, elevators or other movable parts that alter the aerodynamic forces on said elements. These movable surfaces or parts of surfaces are generally called control surfaces. Then the flight controller 31 may be configured to blend inputs to said control surfaces, with inputs to rotors 12, 14 in the coaxial fixed-pitch-variable-pitch pairs. In one embodiment, a port-side and a starboard-side coaxial pair 10 is put in proximity to, or embedded in, respective port and starboard wings, each equipped with ailerons. Depending on the vehicle flight speed, it may be expeditious to effect a rolling-motion of the vehicle, by blending, for example, change in the collective blade pitch angles of the variable pitch rotors 14 in the coaxial pairs 10, with deflection of the ailerons.

As realized herein, adjusting a collective pitch of the one variable-pitch rotor 14 of the coaxial rotor pair assembly 10 enables maximum propulsive efficiency of the pair. Additionally, such also allows for minimizing the net torque of the rotor pair, or on the contrary, producing an unbalanced torque for the pair, to be used by the flight control system to yaw the drone/vehicle 100. The net torque of the rotor pair assembly 10 may be adjusted for a given cumulative thrust, or alternatively, the cumulative thrust can be increased or decreased, for a given net torque, zero or nonzero. Further, as inflow conditions to the upper rotor change, for example in climb vs. hover, the wake of the upper rotor also changes, and hence the inflow to the lower rotor. Accordingly, in embodiments, a collective pitch of the lower, variable-pitch rotor 14 may be changed, to keep the blade angles of the lower rotor within a desired operating range, for example to maximize aerodynamic efficiency. Furthermore, the coaxial rotor pair assembly improves the rotor-pair stall margin, and thus the range of blade angle over which the flight control system can use variable collective rotor pitch as a control effector, before running out of control authority, or control saturation.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A coaxial rotor pair assembly for a flight vehicle, the coaxial rotor pair assembly comprising:

a fixed-pitch rotor comprising a plurality of blades extending in a radial direction;

a variable-pitch rotor comprising a plurality of blades extending in a radial direction;

the fixed-pitch rotor and the variable-pitch rotor being axially spaced relative to one another on a rotor axis and axially aligned along said rotor axis for rotation about the rotor axis via a respective rotor shaft each extending along the rotor axis;

a first motor for the fixed-pitch rotor and a second motor for the variable-pitch rotor, the first motor and the second motor for driving the respective rotor about the rotor axis and each being controlled by an associated speed controller, each of said speed controllers being configured to be controlled by a vehicle flight controller;

wherein a collective pitch of the plurality of blades of the variable-pitch rotor is configured to be selectively varied by the vehicle flight controller during rotation of both the fixed-pitch rotor and the variable-pitch rotor about the rotor axis, and wherein the plurality of blades of the fixed-pitch rotor are maintained a constant, fixed pitch during operation of the flight vehicle, wherein the fixed-pitch rotor and the variable-pitch rotor are configured to counter-rotate relative to one another about the rotor axis, wherein the fixed-pitch rotor has a first number of blades and the variable-pitch rotor has a second number of blades, and wherein the second number of blades is less than the first number of blades.

2. The assembly according to claim 1, wherein the rotor axis is a substantially vertical axis, wherein the fixed-pitch rotor is provided relatively above the variable-pitch rotor on the substantially vertical axis.

3. The assembly according to claim 1, wherein the rotor axis is a substantially vertical axis, wherein the fixed-pitch rotor is provided relatively below the variable-pitch rotor on the substantially vertical axis.

4. The assembly according to claim 1, wherein the fixed-pitch rotor has a first diameter defined by a span of the blades associated therewith and the variable-pitch rotor has a second diameter defined by a span of the blades associated therewith.

5. The assembly according to claim 4, wherein the second diameter is larger than the first diameter.

6. The assembly according to claim 4, wherein the first diameter and the second diameter are substantially equal.

7. The assembly according to claim 4, wherein the second diameter is smaller than the first diameter.

8. A flight vehicle comprising:

a frame;

a plurality of rotors mounted to the frame, each of the rotors having a motor associated therewith for driving the respective rotor about a rotor axis that extends in an axial direction and each of rotors comprising a plurality of blades extending in a radial direction;

at least two of said rotors forming a coaxial rotor pair, each coaxial rotor pair comprising a fixed-pitch rotor and a variable-pitch rotor, the fixed-pitch rotor and the variable-pitch rotor being axially spaced relative to one another on the respective rotor axis and axially aligned along said respective rotor axis for rotation via colinear rotor shafts each extending along the rotor axis;

the fixed-pitch rotor and the variable-pitch rotor having a first motor and a second motor, respectively, associated therewith for driving the respective rotor about the rotor axis; and a plurality of speed controllers each associated with and configured to drive each of the first motor and the second motor, said plurality of speed controllers configured to be controlled by a vehicle flight controller;

wherein the vehicle flight controller is further configured to selectively vary a collective pitch of the plurality of blades of the variable-pitch rotor during rotation of both the fixed-pitch rotor and the variable-pitch rotor about the rotor axis, said plurality of blades of the fixed-pitch rotor being configured to be maintained a constant, fixed pitch during operation of the flight vehicle, wherein the fixed-pitch rotor and the variable-pitch rotor are configured to counter-rotate relative to one another about the rotor axis, wherein the fixed-pitch rotor has a first number of blades and the variable-pitch rotor has a second number of blades, and wherein the second number of blades is less than the first number of blades.

9. The flight vehicle according to claim 8, wherein the rotor axis is a substantially vertical axis, wherein the fixed-pitch rotor is provided relatively above the variable-pitch rotor on the substantially vertical axis.

10. The flight vehicle according to claim 8, wherein the rotor axis is a substantially vertical axis, wherein the fixed-pitch rotor is provided relatively below the variable-pitch rotor on the substantially vertical axis.

11. The flight vehicle according to claim 8, wherein the flight vehicle comprises an even number of coaxial rotor pairs.

12. The flight vehicle according to claim 8, wherein the flight vehicle comprises an odd number of coaxial rotor pairs.

13. The flight vehicle according to claim 8, wherein the fixed-pitch rotor has a first diameter defined by a span of the blades associated therewith and the variable-pitch rotor has a second diameter defined by a span of the blades associated therewith.

14. The flight vehicle according to claim 13, wherein the second diameter is larger than the first diameter.

15. The flight vehicle according to claim 13, wherein the first diameter and the second diameter are substantially equal.

16. The flight vehicle according to claim 13, wherein the second diameter is smaller than the first diameter.

17. A method for controlling the coaxial rotor pair assembly for a flight vehicle according to claim 1, using the vehicle flight controller, the method comprising:

controlling the first motor and the second motor of the fixed-pitch rotor and the variable-pitch rotor;

rotating the fixed-pitch rotor and the variable-pitch rotor about the rotor axis via the rotor shaft; and controlling and changing the collective pitch of the plurality of blades of the variable-pitch rotor via the vehicle flight controller, wherein the plurality of blades of the fixed-pitch rotor are maintained at the constant, fixed pitch during the controlling and changing of the collective pitch.

18. The method according to claim 17, further comprising: detecting failure of the fixed-pitch rotor; and adjusting the collective pitch of the variable-pitch rotor such that the blades are provided at a relatively higher setting, to compensate for loss of thrust.

19. The method according to claim 17, further comprising: detecting failure of the variable-pitch rotor; and adjusting a rotational speed of the fixed-pitch rotor to a relatively higher speed, via the first motor, to compensate for loss of thrust.

\* \* \* \* \*